US012665464B2

(12) United States Patent
Ito et al.

(10) Patent No.: US 12,665,464 B2
(45) Date of Patent: Jun. 23, 2026

(54) ROTATING ELECTRIC MACHINE SYSTEM

(71) Applicant: HONDA MOTOR CO., LTD., Tokyo (JP)

(72) Inventors: Naoki Ito, Wako (JP); Yuki Kamitani, Wako (JP); Tatsuya Choji, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 174 days.

(21) Appl. No.: 18/620,396

(22) Filed: Mar. 28, 2024

(65) Prior Publication Data

US 2024/0333075 A1 Oct. 3, 2024

(30) Foreign Application Priority Data

Mar. 30, 2023 (JP) ................................. 2023-054576

(51) Int. Cl.
| | |
|---|---|
| *H02K 5/173* | (2006.01) |
| *F01D 15/10* | (2006.01) |
| *F16C 19/04* | (2006.01) |
| *F16C 33/66* | (2006.01) |
| *H02K 7/08* | (2006.01) |
| *H02K 7/18* | (2006.01) |
| *H02K 21/14* | (2006.01) |

(52) U.S. Cl.
CPC ........... *H02K 5/1732* (2013.01); *F16C 19/04* (2013.01); *F16C 33/6659* (2013.01); *H02K 7/083* (2013.01); *H02K 7/1823* (2013.01); *H02K 21/14* (2013.01); *F01D 15/10* (2013.01); *F05D 2220/76* (2013.01); *F16C 2360/23* (2013.01)

(58) Field of Classification Search
CPC .... H02K 5/1732; H02K 7/083; H02K 7/1823;
H02K 21/14; H02K 1/27; H02K 9/197;
H02K 1/32; F16C 19/04; F16C 33/6659;
F16C 2360/23; F16C 2380/26; F16C
19/06; F01D 15/10; F05D 2220/76
USPC ........................................................... 310/90
See application file for complete search history.

(56) References Cited

U.S. PATENT DOCUMENTS

| 7,923,891 B2 * | 4/2011 | Kikuichi | ................ | H02K 1/185 |
| | | | | 310/431 |
| 2014/0128192 A1 * | 5/2014 | Korenaga | .............. | B60K 17/14 |
| | | | | 475/5 |

(Continued)

FOREIGN PATENT DOCUMENTS

| DE | 102020207053 A1 * | 12/2021 | ............ F16C 33/586 |
| DE | 10 2020 210 945 A1 | 3/2022 | |

(Continued)

OTHER PUBLICATIONS

Extended European Search Report dated Sep. 13, 2024 issued in corresponding European application No. 24167225.2; 9 pages.

*Primary Examiner* — Charles Reid, Jr.
(74) *Attorney, Agent, or Firm* — Rankin, Hill & Clark LLP

(57) ABSTRACT

A rotating electric machine system is equipped with a rotating electric machine including a rotating shaft and a permanent magnet, and a housing in which the rotating electric machine is accommodated. A bearing is interposed between the housing and the rotating shaft. The bearing is retained by a bearing holder. A pressure applying member is disposed between the bearing holder and the bearing. The pressure applying member applies a pressure to the bearing holder along the axial direction of the rotating shaft.

5 Claims, 12 Drawing Sheets

(56)                    References Cited

U.S. PATENT DOCUMENTS

| 2020/0204021 | A1* | 6/2020 | Kim ......................... H02K 9/19 |
| 2022/0316394 | A1 | 10/2022 | Yazaki et al. |
| 2022/0320945 | A1 | 10/2022 | Yazaki et al. |
| 2023/0208251 | A1 | 6/2023 | Koch et al. |
| 2023/0396118 | A1 | 12/2023 | Linz et al. |

FOREIGN PATENT DOCUMENTS

| EP | 672 035 | A1 | 6/2020 |
| FR | 098 791 | A1 | 1/2021 |
| JP | 2015-002647 | A | 1/2015 |
| JP | 2022-157657 | A | 10/2022 |
| JP | 2022-157784 | A | 10/2022 |
| JP | 2022-157789 | A | 10/2022 |
| WO | 2022/089684 | A1 | 5/2022 |

* cited by examiner

<u>10</u>

20

DIAMETRICAL
DIRECTION

ROTATING ELECTRIC MACHINE SYSTEM

CROSS-REFERENCE TO RELATED APPLICATIONS

This application is based upon and claims the benefit of priority from Japanese Patent Application No. 2023-054576 filed on Mar. 30, 2023, the contents of which are incorporated herein by reference.

BACKGROUND OF THE INVENTION

Field of the Invention

The present invention relates to a rotating electric machine system including a rotating electric machine having a rotor and a stator, and a housing accommodating the rotating electric machine.

Description of the Related Art

As disclosed in JP 2015-002647 A, a rotating electric machine is equipped with a rotor and a stator, and a housing accommodating the rotor and the stator. The rotor is rotatably supported in the housing via bearings.

SUMMARY OF THE INVENTION

As the rotor rotates, the bearings vibrate. Therefore, it is not easy to improve the durability of the bearings.

An object of the present invention is to solve the aforementioned problem.

According to one embodiment of the present invention, there is provided a rotating electric machine system equipped with a rotating electric machine including a rotating shaft and a permanent magnet, and a housing in which the rotating electric machine is accommodated, the rotating electric machine system including a bearing interposed between the housing and the rotating shaft, and including an inner ring and an outer ring, a bearing holder provided in the housing and having a hollow tubular shape, the bearing holder being configured to retain the bearing, and a pressure applying member provided between the bearing holder and the bearing, and configured to apply a pressure to the bearing holder along an axial direction of the rotating shaft.

In accordance with the above-described configuration, a rotational moment acting on the bearing can be considerably reduced. As a result, vibrations of the bearing are suppressed. Consequently, the durability of the bearing can be enhanced.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

In the following description, compressed air AR (refer to FIG. 2 and FIG. 11) is illustrated as an example of a gaseous coolant, and a cooling oil CO (refer to FIG. 2, FIG. 3, and FIG. 11) is illustrated as an example of a liquid coolant. In the present embodiment, the cooling oil CO and a lubricating oil LO, which is supplied to a first bearing 400 and a second bearing 500, are supplied from a same oil supplying device 904 (refer to FIG. 11). However, this is a convenient illustration for the purpose of simplifying the description and to facilitate understanding. The gaseous coolant may be compressed nitrogen or the like. The liquid coolant may be an organic solvent with a high boiling point and low volatility.

Figure 1:
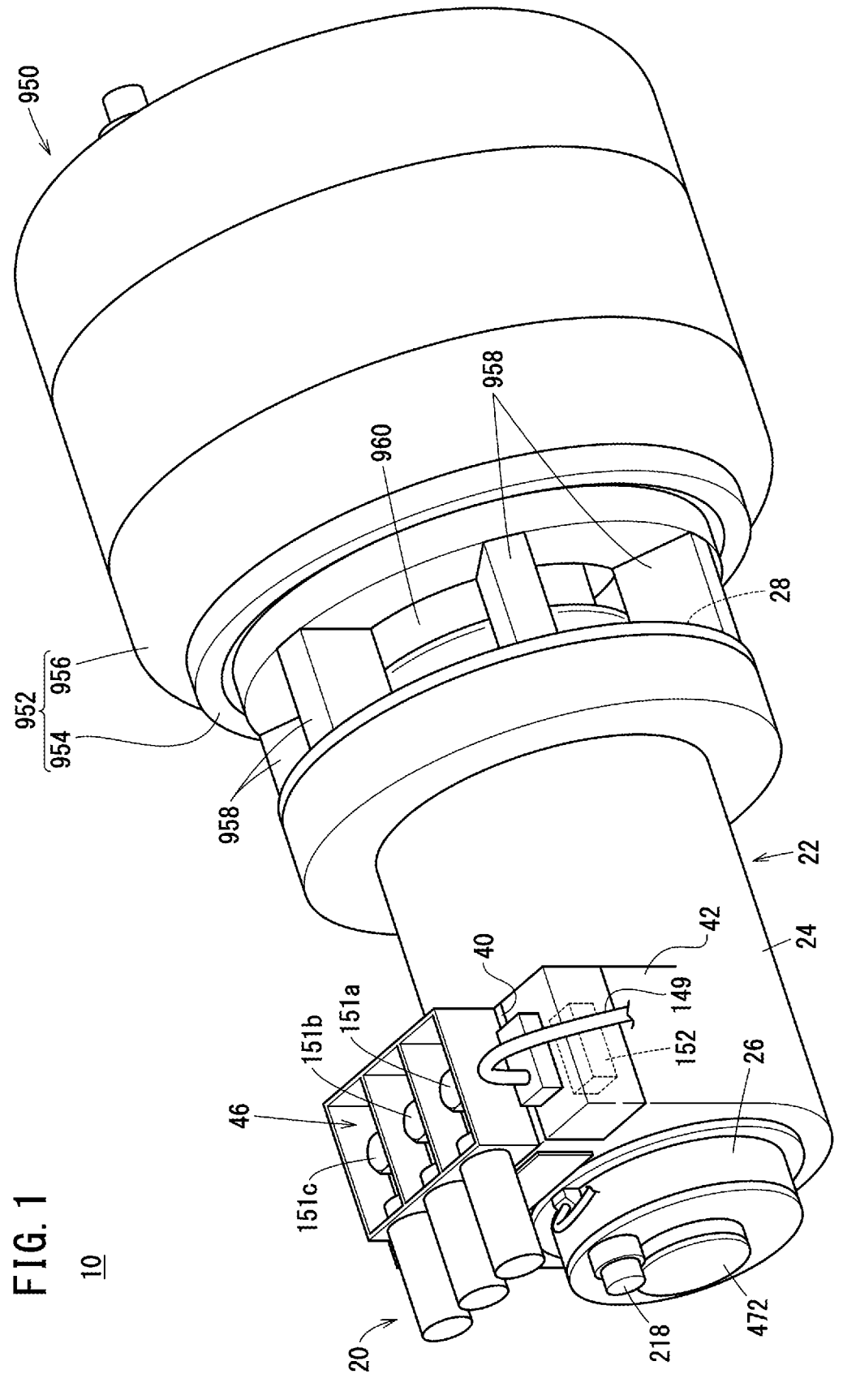
FIG. 1 is a schematic overall perspective view of a combined power system including a rotating electric machine system according to an embodiment of the present invention.

FIG. 1 is a schematic overall perspective view of a combined power system 10 according to the present embodiment. The combined power system 10 is equipped with a rotating electric machine system 20 according to the present embodiment, and a gas turbine engine 950. Each of the rotating electric machine system 20 and the gas turbine engine 950 extends along a longitudinal direction (axial direction). An axial line of the rotating electric machine system 20 and an axial line of the gas turbine engine 950 coincide with each other. Stated otherwise, the rotating electric machine system 20 and the gas turbine engine 950 are arranged in series on the same axial line.

The combined power system 10 is used, for example, as a power source for providing propulsion in a flying object, a ship, an automobile, or the like. Suitable specific examples of the flying object include drones and multi-copters. The combined power system 10, when mounted on a flying object, is used as a power drive source for rotationally urging, for example, a prop, a ducted fan, or the like. The combined power system 10, when mounted on a ship, is used as a screw rotational force generating device. The combined power system 10, when mounted on an automobile, is used as a power drive source for rotating a motor.

The combined power system 10 can also be used as an auxiliary power source in an aircraft, a ship, a building, or the like. Apart therefrom, it is also possible to utilize the combined power system 10 as gas turbine power generation equipment.

The gas turbine engine 950 is an internal combustion engine. Further, the gas turbine engine 950 serves as a gaseous coolant supplying device that supplies compressed air AR. As will be discussed later, the compressed air AR circulates as a gaseous coolant inside a rotating electric machine housing 22 (housing).

In the following description, the respective terms "left", "right", "lower", and "upper" refer specifically to the left, right, lower and upper directions shown in FIG. 2 and FIG. 3. However, these directions are provided for the sake of convenience in order to simplify the description and to facilitate understanding. In particular, the directions described in the specification are not limited to the directions when the combined power system 10 is actually used.

Hereinafter, the left ends in the axial direction of each of the rotating electric machine system 20 and the gas turbine engine 950 may be referred to respectively as first ends. Similarly, the right ends in the axial direction of each of the rotating electric machine system 20 and the gas turbine engine 950 may be referred to as second ends. Further, in each of the respective members, a surface facing toward the first end may be referred to as a "first end surface", and a surface facing toward the second end may be referred to as a "second end surface".

More specifically, in the rotating electric machine system 20, the left end part which is separated away from the gas turbine engine 950 (refer to FIG. 1) is the first end. In the rotating electric machine system 20, the right end part which is in proximity to the gas turbine engine 950 is the second end. Further, in the gas turbine engine 950, the left end part which is in proximity to the rotating electric machine system 20 is the first end. In the gas turbine engine 950, the left end part which is separated away from the rotating electric machine system 20 is the second end. According to these definitions, in the illustrated example, the gas turbine engine 950 is disposed at the second end of the rotating electric machine system 20. The rotating electric machine system 20 is disposed at the first end of the gas turbine engine 950.

A description will be given concerning the rotating electric machine system 20. FIG. 2 and FIG. 3 are schematic cross-sectional views taken along an axial direction of the rotating electric machine system 20. Moreover, in FIG. 2 and FIG. 3, cross sections that differ from each other are shown. The rotating electric machine system 20 is equipped with a rotating electric machine 60, and the rotating electric machine housing 22 (housing) in which the rotating electric machine 60 is accommodated. In the present embodiment, the rotating electric machine 60 is a generator.

The rotating electric machine housing 22 includes a main housing 24, a first sub-housing 26, and a second sub-housing 28. A first end and a second end of the main housing 24 are open ends, and the main housing 24 exhibits a substantially cylindrical shape. The first sub-housing 26 is connected to the first end (the left open end) of the main housing 24. The second sub-housing 28 is connected to the second end (the right open end) of the main housing 24. In the manner described above, the first end and the second end of the main housing 24 are closed.

The main housing 24 includes a thick-walled side wall that extends in a left-right direction. A hollow interior portion 30 is formed in the main housing 24. Such a hollow interior portion 30 is divided into a rotor chamber 34 and a stator chamber 36 by a partition wall member 32. The rotor chamber 34 is a chamber that is formed on an inner side (an inner circumferential side) in a diametrical direction of the partition wall member 32. The stator chamber 36 is a chamber that is formed on an outer side (an outer circumferential side) in the diametrical direction of the partition wall member 32.

A cooling jacket 38 is formed in the interior of a side wall of the main housing 24. A cooling medium (a coolant) such as cooling water or the like flows through the cooling jacket 38. The cooling jacket 38, for example, is a water jacket.

A first casing 40 and a second casing 42 are provided in the vicinity of an edge part of the first end on an outer surface of the side wall of the main housing 24. The first casing 40 and the second casing 42 serve as one portion of the main housing 24. More specifically, the first casing 40 and the second casing 42 are disposed integrally with the main housing 24. The first casing 40 is a terminal casing. The second casing 42 is a measurement instrument casing.

Figure 2:
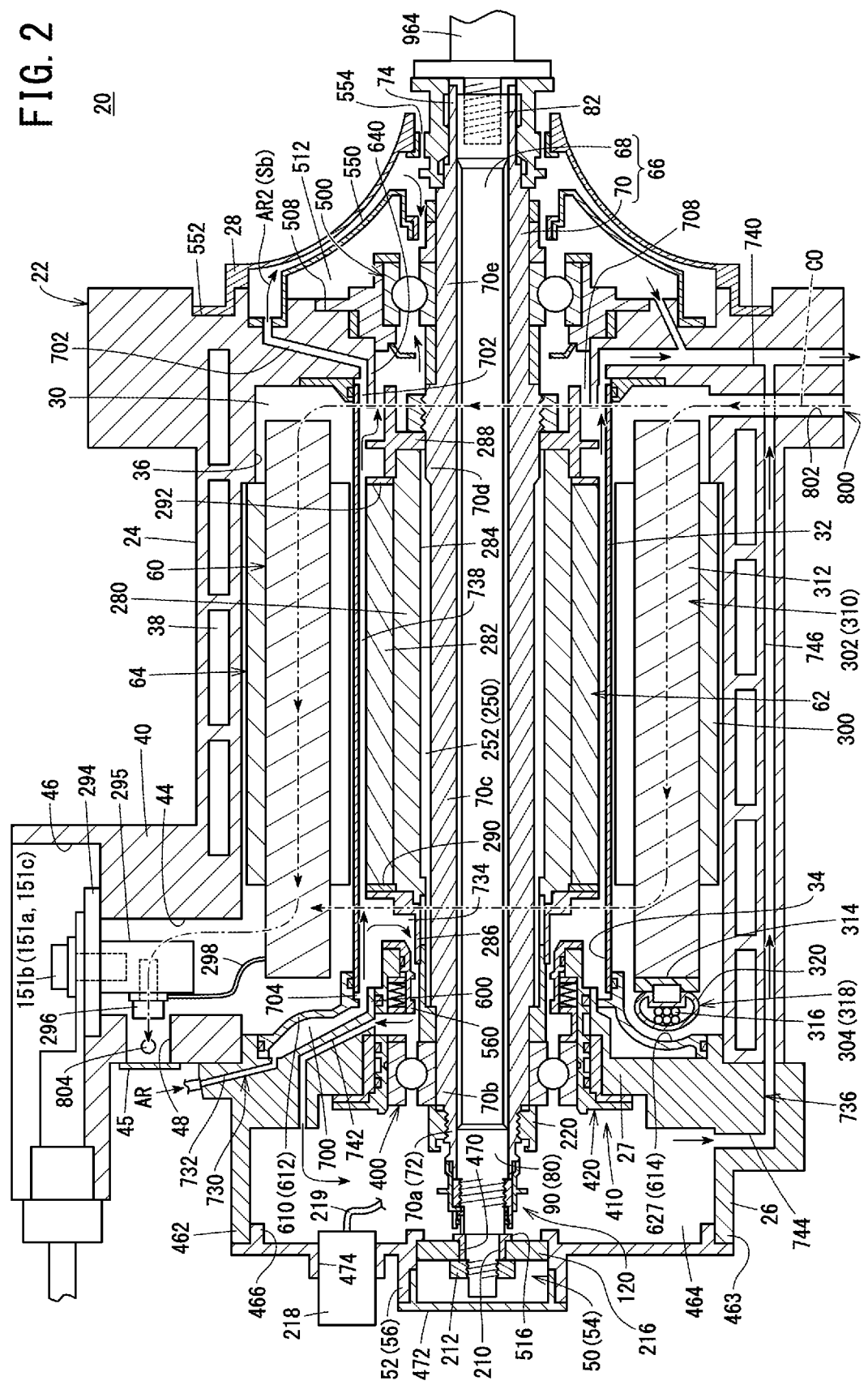
FIG. 2 is a schematic cross-sectional view taken along an axial direction of the rotating electric machine system.

As shown in FIG. 2, a lower contact chamber 44 and an upper terminal chamber 46 are formed in the interior of the first casing 40. The contact chamber 44 and the terminal chamber 46 become spaces that are independent from each other. The contact chamber 44 communicates with the stator chamber 36. In the contact chamber 44, an insertion port 48 is formed that opens at a first end surface of the first casing 40. The insertion port 48 is closed by a lid member 45.

A retaining member 52 that retains a rotational parameter detector 50 is connected to the first sub-housing 26. According to the present embodiment, as the rotational parameter detector 50, a resolver 54 is exemplified. Accordingly, hereinafter, the retaining member 52 of the rotational parameter detector 50 (the resolver 54) will be referred to as a "resolver holder 56".

The rotating electric machine 60 is equipped with a rotor 62, and a stator 64 that surrounds an outer circumference of the rotor 62. The rotor 62 includes a rotating shaft 66. The partition wall member 32 is interposed between the rotor 62 and the stator 64 in a diametrical direction of the rotating shaft 66. Accordingly, the rotor 62 is positioned on the inner circumferential side of the partition wall member 32. Stated otherwise, the rotor 62 is accommodated in the rotor chamber 34. The stator 64 is positioned on the outer circumferential side of the partition wall member 32. Stated otherwise, the stator 64 is accommodated in the stator chamber 36.

The rotating shaft 66 includes an inner shaft 68, and a hollow tubular shaped outer shaft 70. Both ends of the outer shaft 70 are open ends. More specifically, as shown in FIG. 2, the outer shaft 70 has a first hollow end part 72 and a second hollow end part 74.

Figure 4:
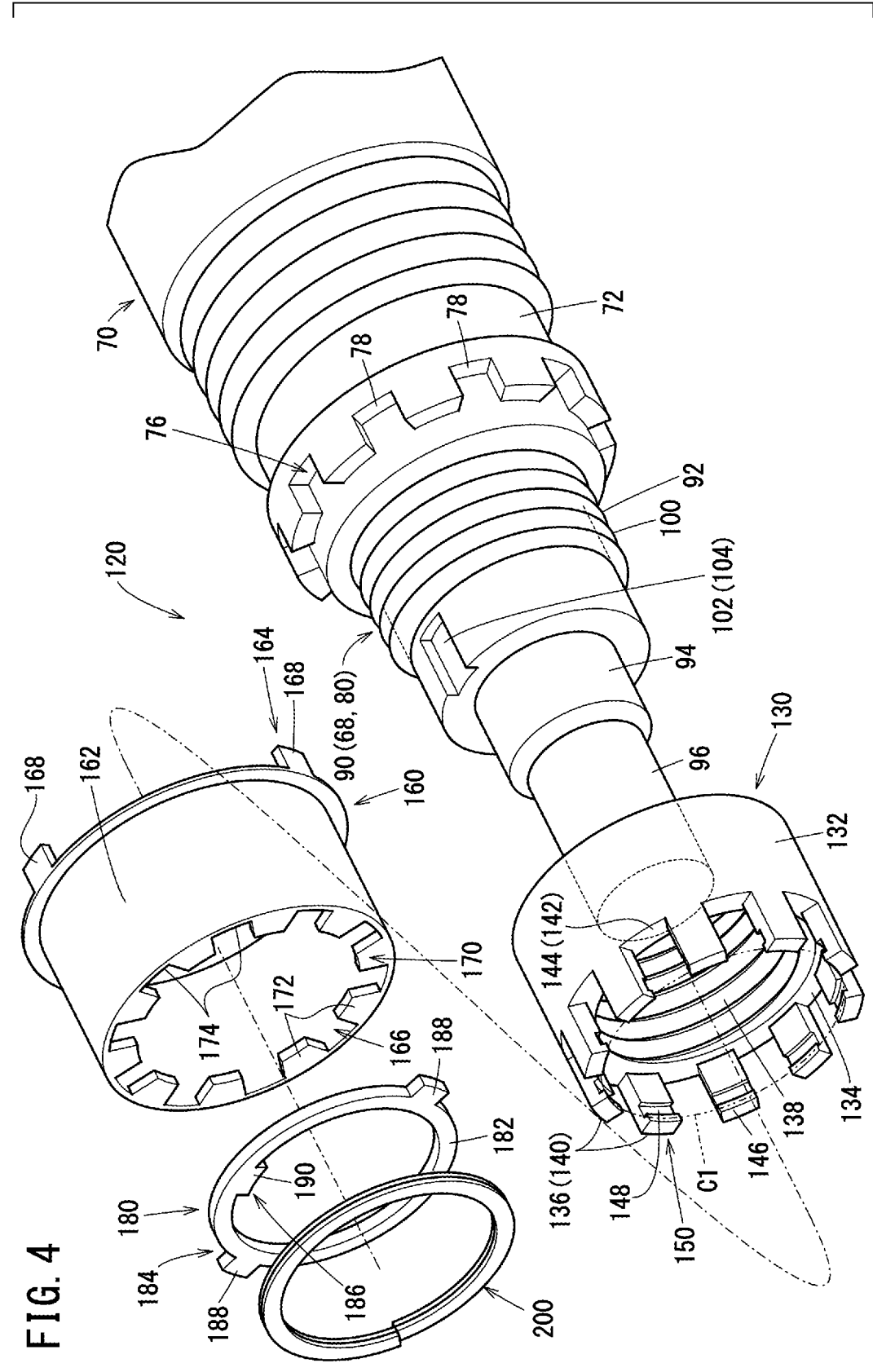
FIG. 4 is an exploded perspective view of a positioning and fixing member that connects an outer shaft and an inner shaft.
Figure 5:
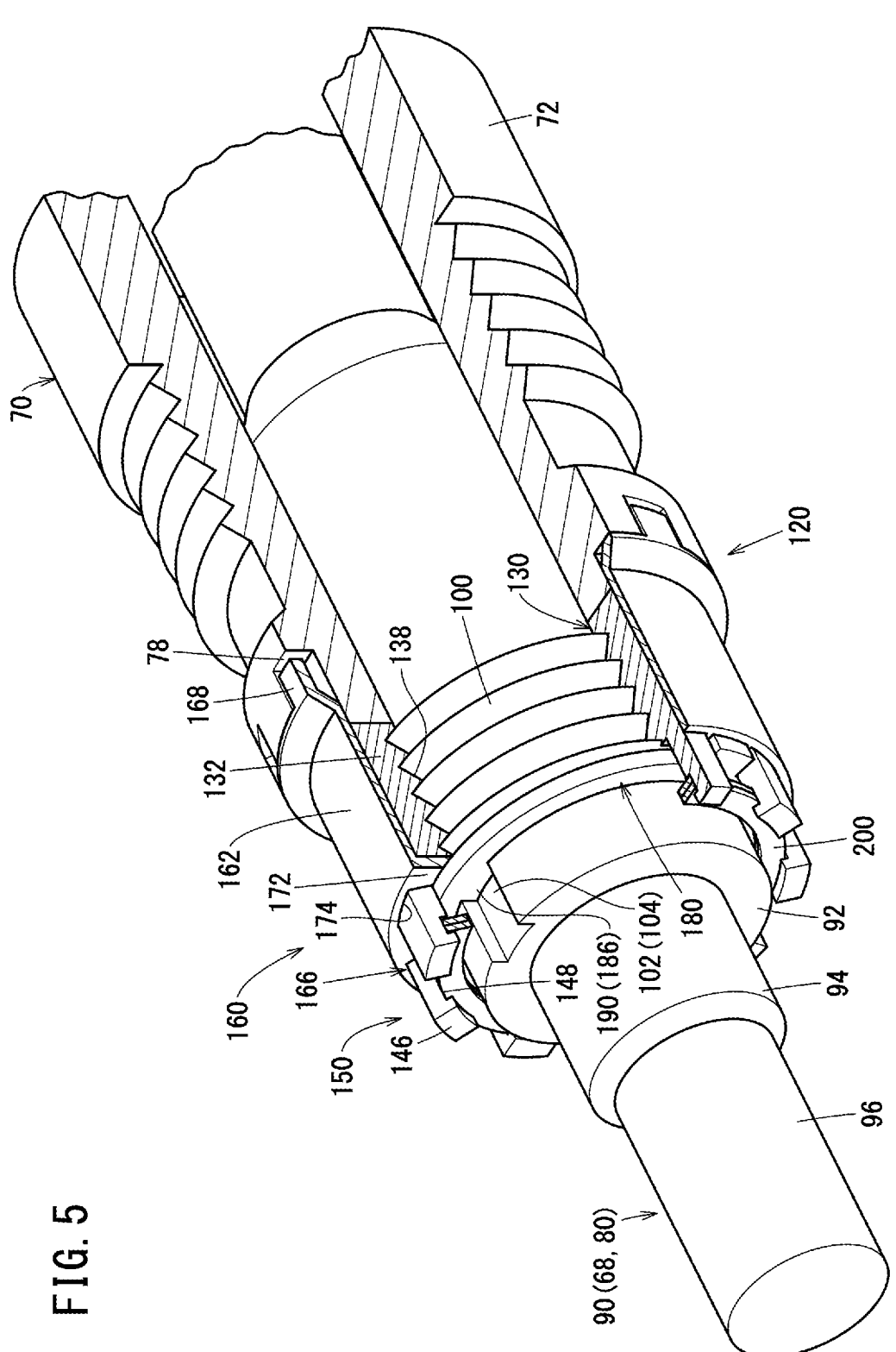
FIG. 5 is a partial cross-sectional perspective view at a time when the outer shaft and the inner shaft are connected by the positioning and fixing member.

As shown in FIG. 4 and FIG. 5, a first locking member 76 is formed in close proximity to a distal end of the first hollow end part 72. In this case, the first locking member 76 includes a plurality of engagement grooves 78 that are arranged at intervals in the circumferential direction. Each of the individual engagement grooves 78 is recessed inwardly in a diametrical direction from an outer circumferential surface of the edge part, and extends slightly toward the second hollow end part 74.

The inner shaft 68 is removably inserted in the interior of the outer shaft 70. The inner shaft 68 is longer in length than the outer shaft 70. As shown in FIG. 2, the inner shaft 68 includes a left end part 80 (an end part on a first end side) which is one end part in the axial direction, and a right end part 82 (an end part on a second end side) which is another end part in the axial direction. The left end part 80 is an end part on the inner shaft 68 that is separated away from the gas turbine engine 950. The right end part 82 is an end part on the inner shaft 68 that is in proximity to the gas turbine engine 950.

One portion of the left end part 80 is exposed from the first hollow end part 72 of the outer shaft 70. Hereinafter, in the left end part 80, one portion thereof that is exposed from the first hollow end part 72 will be referred to as an extending portion 90. As shown in detail in FIG. 4 and FIG. 5, the extending portion 90 has a large diameter portion 92, a medium diameter portion 94, and a small diameter portion 96. The diameter of the medium diameter portion 94 is smaller than the diameter of the large diameter portion 92. The diameter of the small diameter portion 96 is smaller than the diameter of the medium diameter portion 94.

In the large diameter portion 92, a male threaded portion 100 is formed on an outer circumferential surface of a portion in proximity to the first hollow end part 72. In the large diameter portion 92, a fourth locking member 102 is formed on the outer circumferential surface thereof at a portion in close proximity to the medium diameter portion 94. In this case, the fourth locking member 102 includes a key groove 104.

The first hollow end part 72 of the outer shaft 70, and the left end part 80 of the inner shaft 68 are connected via a positioning and fixing member 120. A description will now be given concerning the positioning and fixing member 120. The positioning and fixing member 120 includes a nut member 130, a locking sleeve 160, a locking ring 180, and a retainer member 200.

The nut member 130 includes a nut main body 132, an annular shaped projecting member 134, and a second locking member 136. A female threaded portion 138 is formed on an inner circumferential surface of the nut main body 132. The annular shaped projecting member 134 is provided on the inner circumferential surface of the nut main body 132 in close proximity to the first end. The annular shaped projecting member 134 projects out from the inner circumferential surface of the nut main body 132 in an annular shape inwardly in the diametrical direction of the nut main body 132. The inner diameter of the annular shaped projecting member 134 is slightly larger than the diameter of the medium diameter portion 94, and slightly smaller than the diameter of the large diameter portion 92.

The second locking member 136 includes a plurality of projecting members 140. The projecting members 140 extend toward the axial direction from a first end surface of the nut main body 132. The direction in which the projecting members 140 extend is a direction to separate away from the outer shaft 70. The plurality of projecting members 140 are spaced apart from each other at equal intervals in the circumferential direction of the nut main body 132. A third locking member 142 is disposed between two adjacent ones from among the plurality of projecting members 140. The third locking member 142 are gaps 144 that are formed between two adjacent ones of the projecting members 140 that are spaced apart from each other.

First ends of the projecting members 140 are bent inwardly in the diametrical direction of the rotating shaft 66. In accordance with this feature, claw members 146 are provided at first ends of the projecting members 140. Furthermore, insertion recesses 148 are formed on an inner circumferential surface of the projecting members 140 which are recessed outwardly in the diametrical direction of the rotating shaft 66. The claw members 146 and the insertion recesses 148 serve as a retaining portion 150 with respect to the retainer member 200. By the retaining portion 150 (the claw members 146 and the insertion recesses 148), the retainer member 200 is prevented from coming off from inside the projecting members 140.

The locking sleeve 160 includes a tubular shaped main body portion 162, a first engaging member 164, and a second engaging member 166. The first engaging member 164 is defined by a plurality of protrusions 168 that project out from the second end of the tubular shaped main body portion 162 toward the second hollow end part 74 of the outer shaft 70. The protrusions 168 are disposed at intervals in the circumferential direction, and extend along the axial direction. The number of the protrusions 168 may be less than the number of the engagement grooves 78. The number of the protrusions 168 may also be the same as the number of the engagement grooves 78.

The locking sleeve 160 includes a diametrically directed projection 170 that projects out diametrically inward from the first end of the tubular shaped main body portion 162. The diametrically directed projection 170 includes a plurality of individual tab-shaped portions 172 that are equally spaced apart from each other. Gaps 174 are formed between two adjacent ones of the tab-shaped portions 172 that are spaced apart from each other. By inserting the projecting members 140 into the gaps 174, the second engaging member 166 engages with the second locking member 136.

The locking ring 180 includes an annular portion 182, a third engaging member 184, and a fourth engaging member 186. The third engaging member 184 is two tongue portions 188 that project outwardly in a diametrical direction from the outer circumferential surface of the annular portion 182. The two tongue portions 188 are spaced apart from each other at an interval of roughly 180° in the circumferential direction of the annular portion 182. It should be noted that the number of the tongue portions 188 may be one, or three or more. The number of the tongue portions 188 may be the same as the number of the gaps 174. The fourth engaging member 186 is a convex portion 190 that projects out inwardly in the diametrical direction from the inner circumferential surface of the annular portion 182. In the illustrated example, the number of the convex portions 190 is one, however, the number of the convex portions 190 may be plural. However, in that case, the number of the key grooves 104 is also plural. The fourth engaging member 186 is disposed at a position that is shifted with respect to the two tongue portions 188 in the circumferential direction of the annular portion 182.

The retainer member 200 is an annular shaped member, and has a predetermined wall thickness along the axial direction. The wall thickness of the retainer member 200 is approximately equal to the length of the insertion recesses 148 in the axial direction.

The positioning and fixing member 120 is configured in the following manner. First, the female threaded portion 138 that is formed on the nut member 130 is screw-engaged with the male threaded portion 100 that is formed on the outer circumferential surface of the large diameter portion 92 that constitutes the extending portion 90 (one portion of the inner shaft 68). When the screw-engagement is completed, a second end surface of the nut main body 132 abuts against a first end surface of the outer shaft 70.

Next, the locking sleeve 160 is attached to the first hollow end part 72. The tubular shaped main body portion 162 of the locking sleeve 160 covers the nut member 130. The first engaging member 164, which is provided on a second end of the locking sleeve 160, engages with the first locking member 76 that is formed on the first hollow end part 72. More specifically, the plurality of protrusions 168 engage respectively with the plurality of engagement grooves 78.

Due to such engagement, relative rotation between the locking sleeve 160 and the first hollow end part 72 about the axial line of the rotating shaft 66 is restricted. In this state, the second end surface of the tab-shaped portions 172 abuts against a first end surface of the nut main body 132.

Further, the second locking member 136 of the nut member 130 engages with respect to the second engaging member 166 that is formed on a first end of the locking sleeve 160. More specifically, the plurality of projecting members 140 that constitute the nut member 130 are inserted into the gaps 174 formed between two adjacent ones of the individual tab-shaped portions 172 that are spaced apart and are mutually adjacent to each other. Due to such engagement, relative rotation between the locking sleeve 160 and the nut member 130 about the axial line of the rotating shaft 66 is restricted.

Next, the locking ring 180 is inserted into the inner circumference of the plurality of projecting members 140. At this time, the third engaging member 184 of the locking ring 180 engages with the third locking member 142 provided on the nut member 130. More specifically, the third engaging member 184 is inserted into each of the gaps 144 that are formed between two adjacent ones of the projecting members 140 that are spaced apart from each other. Further, the fourth engaging member 186 of the locking ring 180 is engaged with the fourth locking member 102 (the key groove 104) of the extending portion 90. In accordance with this feature, accompanying the rotating shaft 66 undergoing rotation, the nut member 130 and the locking sleeve 160 rotate together in an integral manner. More specifically, the nut member 130 and the locking sleeve 160 are prevented from rotating idly with respect to the rotating shaft 66.

Next, the retainer member 200 is inserted into the inner circumference of the plurality of projecting members 140. In this case, the outer circumferential edge part of the retainer member 200 is inserted into the insertion recesses 148. Consequently, the retainer member 200 and the locking ring 180 are prevented from coming off from the extending portion 90.

The diameter of an inscribed circle C1 formed by connecting the innermost circumferential portions of the claw members 146 is smaller than the outer diameter of the retainer member 200. Accordingly, even in the case that the outer circumferential edge part of the retainer member 200 is separated away from the insertion recesses 148, the retainer member 200 is prevented from passing through the claw members 146.

Even if there is a rotating shaft other than the rotating shaft 66 that makes up the rotor 62 of the rotating electric machine 60, in the case that such a rotating shaft includes the outer shaft 70 and the inner shaft 68, it is possible for the inner shaft 68 and the outer shaft 70 to be connected via the aforementioned positioning and fixing member 120. More specifically, the rotating shaft 66, which is constituted by connecting the inner shaft 68 and the outer shaft 70 via the above-described positioning and fixing member 120, is not limited to being the rotating shaft 66 that makes up the rotor 62 of the rotating electric machine 60.

Returning to FIG. 2 and FIG. 3, a resolver rotor 210 and a lock nut 212 are provided at the extending distal end of the extending portion 90. The lock nut 212 is positioned more outwardly than the resolver rotor 210 in the axial direction of the extending portion 90. By the lock nut 212, the resolver rotor 210 is prevented from coming off from the extending portion 90.

The outer shaft 70 includes a first shaft portion 70a to a fifth shaft portion 70e along a direction from the first end toward the second end. The outer diameter becomes larger in a stepwise manner from the first shaft portion 70a until a fourth shaft portion 70d. More specifically, for example, a second shaft portion 70b is larger in diameter than the first shaft portion 70a, and further, is smaller in diameter than a third shaft portion 70c. Similarly, the third shaft portion 70c is larger in diameter than the second shaft portion 70b, and further, is smaller in diameter than the fourth shaft portion 70d.

A screw cap 220 is screw-engaged with the first shaft portion 70a. The screw cap 220 is positioned more outwardly than the first bearing 400 in the axial direction of the extending portion 90. A second end surface of the screw cap 220 abuts against a first end surface of a first inner ring 402 (refer to FIG. 6) of the first bearing 400.

Figure 3:
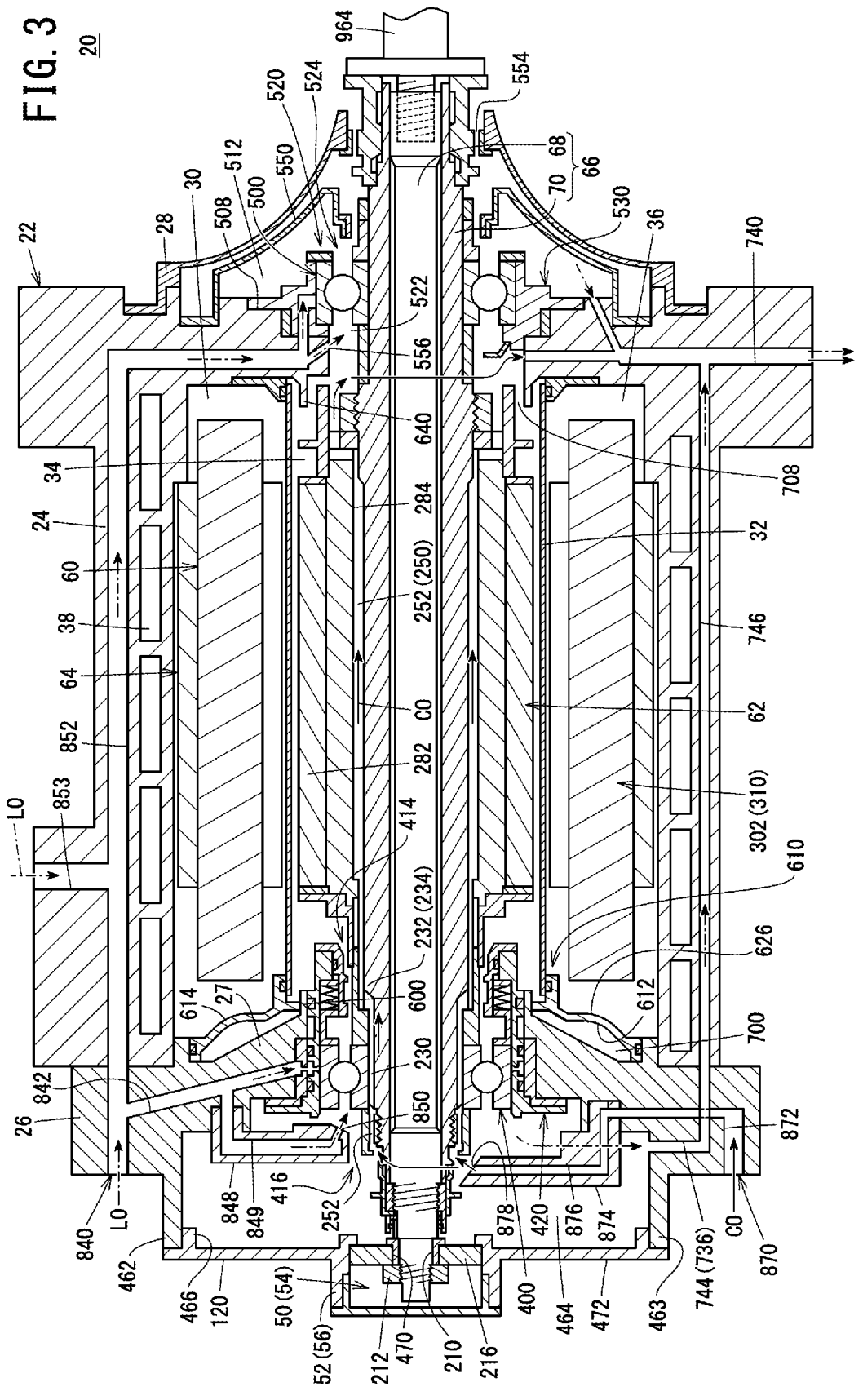
FIG. 3 is a schematic cross-sectional view of the rotating electric machine system taken along the axial direction at a different angle from that shown in FIG. 2.
Figure 6:
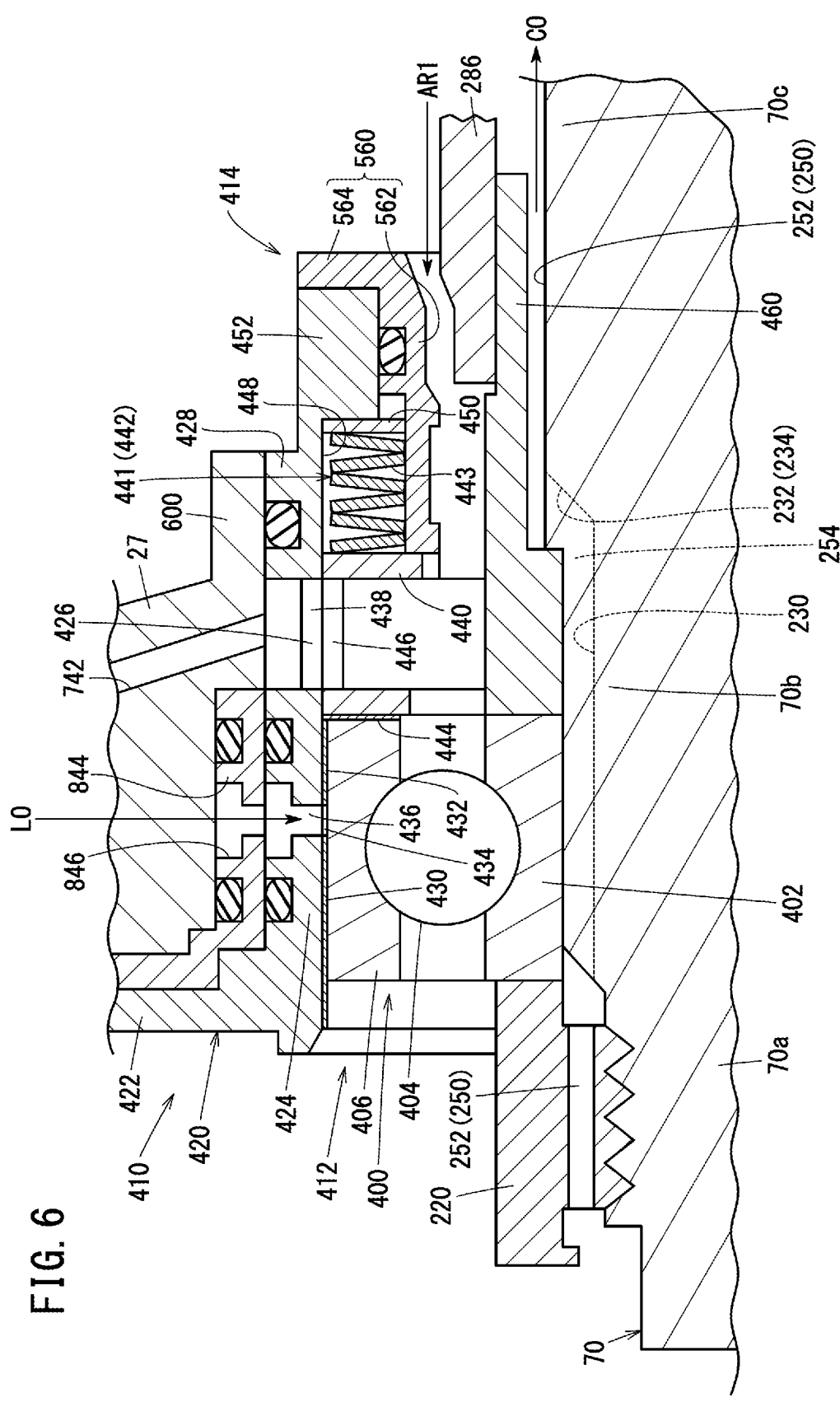
FIG. 6 is an enlarged cross-sectional view of main parts in the vicinity of a first bearing.

As shown in FIG. 3 and FIG. 6, on a side circumferential surface of the second shaft portion 70b, which has a smaller diameter than the third shaft portion 70c, a plurality of groove shaped flow paths 230 are formed along the circumferential direction of the second shaft portion 70b. In FIG. 6, an individual one from among the plurality of groove shaped flow paths 230 is shown. Each of the groove shaped flow paths 230 is recessed inwardly in a diametrical direction of the second shaft portion 70b from a side circumferential surface (an outer surface) of the second shaft portion 70b, and further, extends along the axial direction of the rotating shaft 66. The first bearing 400 is provided diametrically outward of the second shaft portion 70b. An inner circumferential surface of the first inner ring 402 of the first bearing 400 covers the groove shaped flow paths 230. In accordance therewith, one portion of a rotor internal flow path 250 (to be described later) is formed.

On a side circumferential surface of the third shaft portion 70c which is larger in diameter than the second shaft portion 70b, a plurality of guide flow paths 232 are formed along the circumferential direction of the third shaft portion 70c. In FIG. 6, an individual one from among the plurality of guide flow paths 232 is shown. Each of the guide flow paths 232 is formed at a first end of the third shaft portion 70c facing toward the second shaft portion 70b. The guide flow paths 232 are continuous with the groove shaped flow paths 230. The guide flow paths 232 constitute one portion of the rotor internal flow path 250. As bottom surfaces 234 of the guide flow paths 232 separate away from the second shaft portion 70b, the bottom surfaces are inclined surfaces that are inclined in a diametrical outward direction, in a manner so as to be inclined from an inner side in the diametrical direction of the rotating shaft 66 toward the outer surface (the side circumferential surface) of the third shaft portion 70c.

As shown in FIG. 2 and FIG. 3, permanent magnets 282 are retained on the third shaft portion 70c via a magnet holder 280 that is made up from a cylindrical member or the like. The rotor 62 is constituted by including the rotating shaft 66, the magnet holder 280, and the permanent magnets 282. An inner hole 284 that extends along the axial direction of the magnet holder 280 is formed in the magnet holder 280. The rotating shaft 66 is passed through the inner hole 284. Accordingly, in the diametrical direction of the rotating shaft 66, the magnet holder 280 is interposed between the rotating shaft 66 and the permanent magnets 282.

The magnet holder 280 and the permanent magnets 282 are sandwiched between a first magnet stopper 286 and a second magnet stopper 288 in the axial direction of the rotating shaft 66. In accordance therewith, the magnet holder 280 is positioned and fixed on an outer circumferential surface of the outer shaft 70. More specifically, a positional deviation of the magnet holder 280 and the permanent magnets 282 with respect to the outer shaft 70 is prevented. In this manner, the first magnet stopper 286 and the second magnet stopper 288 position and fix the permanent magnets 282 by positioning and fixing the magnet holder 280.

One portion of the first magnet stopper 286 is interposed between an inner circumferential surface of a guide member 560 and an outer circumferential surface of an inner ring stopper 460. A first ring body 290 is sandwiched between the first magnet stopper 286 and the permanent magnets 282 in the axial direction of the rotating shaft 66. The second magnet stopper 288 covers the outer surface of the fourth shaft portion 70*d*. A second ring body 292 is sandwiched between the permanent magnets 282 and the second magnet stopper 288 in the axial direction of the rotating shaft 66. The first end and the second end of the magnet holder 280 are each passed through respective through holes of the first ring body 290 and the second ring body 292.

In the foregoing manner, annular shaped flow through spaces 252 are formed respectively in the screw cap 220, between the groove shaped flow paths 230 of the second shaft portion 70*b* and the first inner ring 402 of the first bearing 400, between the third shaft portion 70*c* and the inner ring stopper 460, and between the third shaft portion 70*c* and the magnet holder 280. The rotor internal flow path 250 is formed by these flow through spaces 252.

The rotor internal flow path 250 is a flow path that extends along the axial direction of the rotating shaft 66, and for example, may be an annular space that extends partially in the axial direction. The rotor internal flow path 250 extends from the first ends to the second ends of the permanent magnets 282 in the axial direction of the rotating shaft 66. The rotor internal flow path 250 may be a groove or the like.

Figure 7:
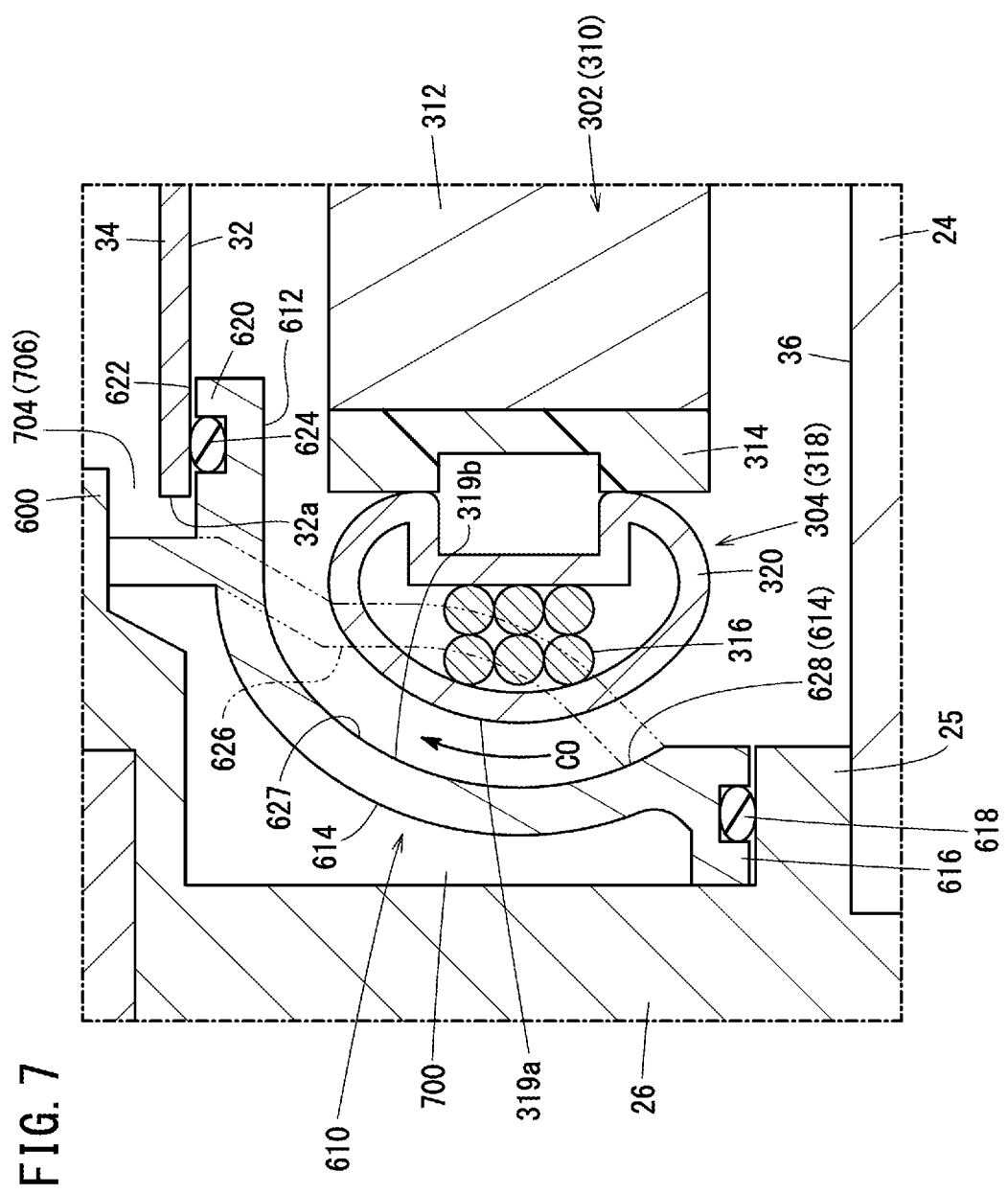
FIG. 7 is an enlarged cross-sectional view of main parts in the vicinity of a neutral point fixing structure.
Figure 8:
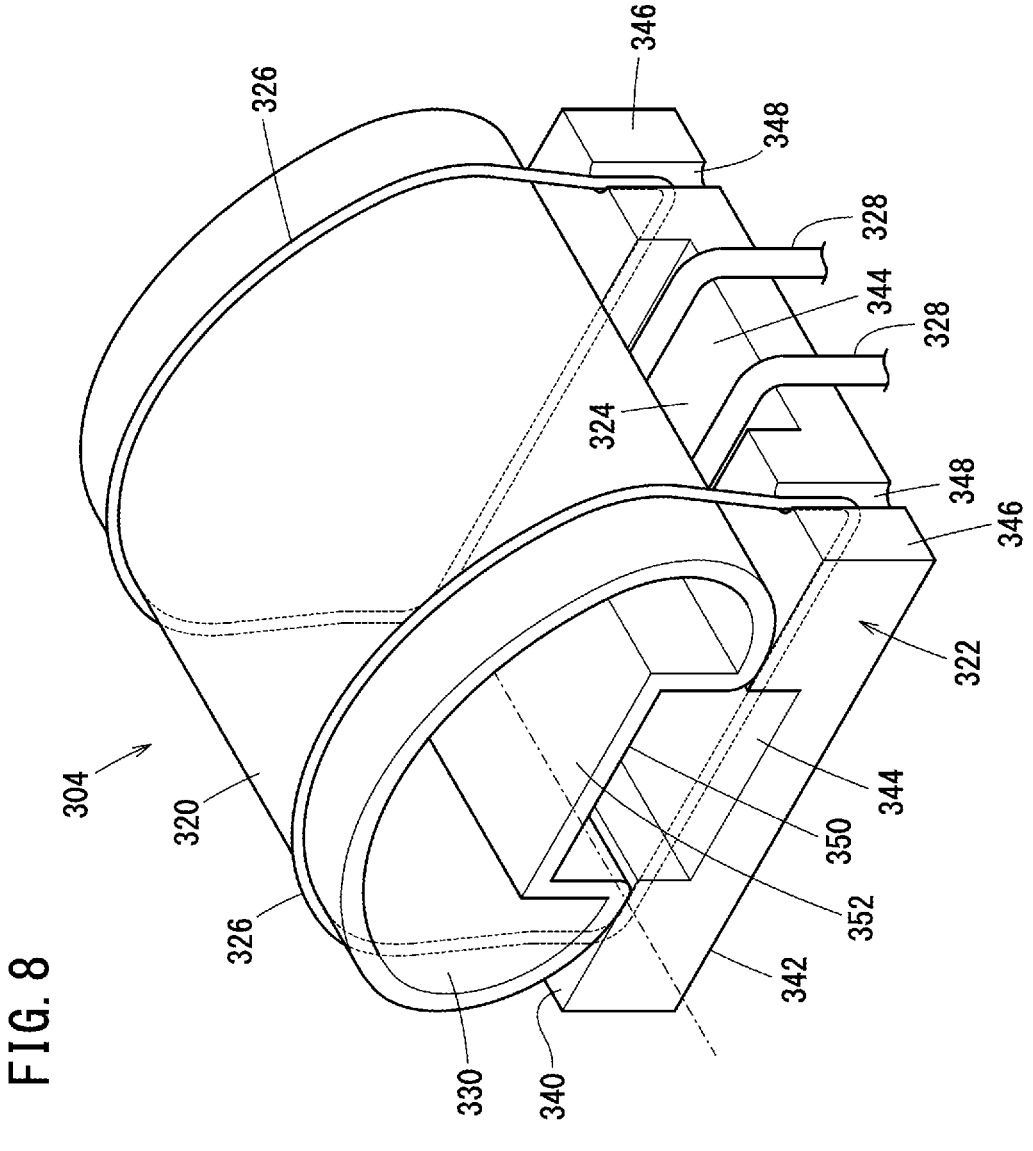
FIG. 8 is a schematic perspective view of the neutral point fixing structure.

The rotor 62 is constituted in the manner described above. Next, a description will be given concerning the stator 64. The stator 64 constitutes the rotating electric machine 60 together with the aforementioned rotor 62. The stator 64 includes a stator core 300, a coil unit 302, and a neutral point fixing structure 304 as shown in FIG. 7 and FIG. 8.

The stator core 300 (refer to FIG. 2 and FIG. 3) is a cylindrical shaped member. The stator core 300 is constituted by laminating a plurality of ring-shaped electromagnetic steel plates in the axial direction. A plurality of individual slots are formed in the stator core 300. The plurality of individual slots are formed on an inner side of the stator core 300 at intervals in the circumferential direction. Teeth portions are formed between adjacent ones of the slots.

The coil unit 302 includes a plurality of electromagnetic coils 310. The plurality of electromagnetic coils 310 are a U-phase coil, a V-phase coil, and a W-phase coil. As can be understood from this feature, in the case that the rotating electric machine 60 is a generator, the rotating electric machine 60 is a so-called three-phase power source. Each of the plurality of electromagnetic coils 310 is constituted by winding conductive wires 312 around the teeth portions of the stator core 300. Therefore, the plurality of electromagnetic coils 310 are arranged in an annular shape with respect to the stator core 300.

Among the plurality of electromagnetic coils 310, portions thereof that protrude in the axial direction from the stator core 300 become end portions of the electromagnetic coils 310. The end portions of the plurality of electromagnetic coils 310 constitute a coil end portion 314. More specifically, the coil unit 302 includes the coil end portion 314 that serves as an end portion of the plurality of electromagnetic coils 310.

Concerning each of the plurality of electromagnetic coils 310, the other ends (terminal ends 316) of the conductive wires 312 that make up the electromagnetic coils 310 are pulled out from the coil end portion 314 of the coil unit 302. The terminal ends 316 of the plurality of conductive wires 312, by being bundled together and connected, thereby constitute a neutral point 318. The neutral point fixing structure 304 shown in FIG. 7 and FIG. 8 fixes the neutral point 318 to the coil end portion 314.

As shown in FIG. 8, the neutral point fixing structure 304 includes a neutral point terminal 320, an insulating member 322, a coolant passage 324, a first threaded portion 326, and a second threaded portion 328.

The neutral point terminal 320 is disposed at the neutral point 318. The insulating member 322 is disposed between the neutral point terminal 320 and the coil end portion 314. The neutral point terminal 320 is fixed to the coil end portion 314 via the insulating member 322. The coolant passage 324 allows the cooling oil CO, which is a liquid coolant, to pass between the neutral point terminal 320 and the insulating member 322.

Specifically, the neutral point terminal 320 is a conductive tubular shaped member. The neutral point terminal 320 may also be a non-conductive tubular shaped member. The terminal ends 316 of the plurality of conductive wires 312 which are drawn out from the coil unit 302 are inserted into an inner side space 330 of the neutral point terminal 320.

The insulating member 322 is a pedestal that is disposed on the coil end portion 314 and on which the neutral point terminal 320 is arranged. The insulating member 322 is a rectangular shaped block. The insulating member 322 is made of an electrically insulating material such as polytetrafluoroethylene (PTFE) or the like.

The insulating member 322 includes a first surface 340 and a second surface 342 which are surfaces that are on opposite sides from each other. The neutral point terminal 320 is arranged on the first surface 340. The second surface 342 abuts against the coil end portion 314.

On the first surface 340, first concave portions 344 are formed along the first surface 340. Specifically, on the first surface 340, two of the first concave portions 344 are formed along the first surface 340. The two first concave portions 344 intersect one another. According to the present embodiment, by the first surface 340 of the insulating member 322 being recessed in a cross shape toward the second surface 342, the two first concave portions 344 that are perpendicular to each other are formed in the first surface 340. Accordingly, by forming the two first concave portions 344, rectangular shaped projecting members 346, which project out so as to separate away from the coil end portion 314, are formed at the four corners of the insulating member 322. The neutral point terminal 320 is arranged on the four projecting members 346.

Locking grooves 348 are formed in the insulating member 322. The locking grooves 348 are formed in portions within the surface of the insulating member 322 that do not come into contact with the neutral point terminal 320. According to the present embodiment, two of the locking grooves 348 are formed in the insulating member 322. The two of the locking grooves 348 are formed in the insulating member 322 with a space between them. Each of the two locking grooves 348 is formed in a U-shape between a side surface of one of the projecting members 346, the second surface 342, and a side surface of another one of the projecting members 346.

The neutral point terminal 320, for example, is a conductive member. The neutral point terminal 320 may also be a non-conductive member. The outer circumferential surface of the neutral point terminal 320 abuts against the first surface 340 of the insulating member 322. The neutral point terminal 320 is arranged on the insulating member 322 with the outer circumferential surface abutting against the first surface 340.

The terminal ends 316 of the plurality of conductive wires 312 which are drawn out from the coil unit 302 are inserted into the inner side space 330 of the neutral point terminal 320.

Within the neutral point terminal 320, a portion thereof that faces toward one of the first concave portions 344 is recessed on an inner side of the neutral point terminal 320, thereby forming a second concave portion 350. Specifically, the second concave portion 350 is formed in a portion within an outer circumferential surface of the neutral point terminal 320 that abuts against the first surface 340 of the insulating member 322. Two of the first concave portions 344 are formed in the insulating member 322. Therefore, from among the two first concave portions 344, the second concave portion 350 is formed in parallel with one of the first concave portions 344.

By the second concave portion 350 being recessed on the inner side of the neutral point terminal 320, a projecting member 352 that projects out toward the inner side of the neutral point terminal 320 is formed in the inner side space 330 of the neutral point terminal 320. The projecting member 352 presses the terminal ends 316 of the plurality of conductive wires 312 that are inserted into the inner side space 330 of the neutral point terminal 320. In accordance with this feature, the terminal ends 316 of the plurality of conductive wires 312 are fixed in the inner side space 330 of the neutral point terminal 320.

The coolant passage 324 is constituted by the first concave portions 344 and the second concave portion 350. As described above, two of the first concave portions 344 are formed in the insulating member 322. Further, the second concave portion 350 is formed in the neutral point terminal 320. Therefore, by the neutral point terminal 320 being disposed on the first surface 340 (the four projecting members 346) of the insulating member 322, one coolant passage 324 is constituted by one of the first concave portions 344 and the second concave portion 350. Further, another coolant passage 324 is constituted by another one of the first concave portions 344. Stated otherwise, two of the coolant passages 324 are formed between the neutral point terminal 320 and the insulating member 322.

The first threaded portion 326 is wound around the insulating member 322 and the neutral point terminal 320 that is disposed on the insulating member 322. Specifically, two of the first threaded portions 326 are wound around the insulating member 322 and the neutral point terminal 320. Two of the locking grooves 348 are formed in the insulating member 322. One of the first threaded portions 326 is wound around the insulating member 322 and the neutral point terminal 320, in a manner so as to be locked in one of the locking grooves 348. Another one of the first threaded portions 326 is wound around the insulating member 322 and the neutral point terminal 320, in a manner so as to be locked in another one of the locking grooves 348. Consequently, the insulating member 322 is fixed to the neutral point terminal 320.

The second threaded portion 328 is wound around the coil end portion 314, and also around the insulating member 322 that is disposed on the coil end portion 314. Specifically, two of the second threaded portions 328 are wound around the coil end portion 314 and the insulating member 322. The two second threaded portions 328 are wound around the coil end portion 314 and the insulating member 322, in a manner so as to be locked in the other of the first concave portions 344. In accordance therewith, the insulating member 322 is fixed to the coil end portion 314.

Next, a description will be given concerning the first end and the second end of the rotor 62.

As shown in FIG. 2, FIG. 3, and FIG. 6, the first end of the rotating shaft 66 is rotatably retained in the first sub-housing 26 via the first bearing 400. Specifically, the first sub-housing 26 includes a bearing retaining member 27 in which a first bearing chamber 410 is formed. The bearing retaining member 27 is a portion in the vicinity of a diametrical center of the first sub-housing 26. The first bearing chamber 410 is formed so as to extend from the first end to the second end of the bearing retaining member 27. The first end of the rotating shaft 66 is passed through the first bearing chamber 410.

As shown in FIG. 6, the first bearing 400 that is disposed on the second shaft portion 70b of the outer shaft 70 includes the first inner ring 402, first rolling balls 404, and a first outer ring 406. The entirety (the first inner ring 402, the first rolling balls 404, and the first outer ring 406) of the first bearing 400 is made up from a metal material.

Figure 9:
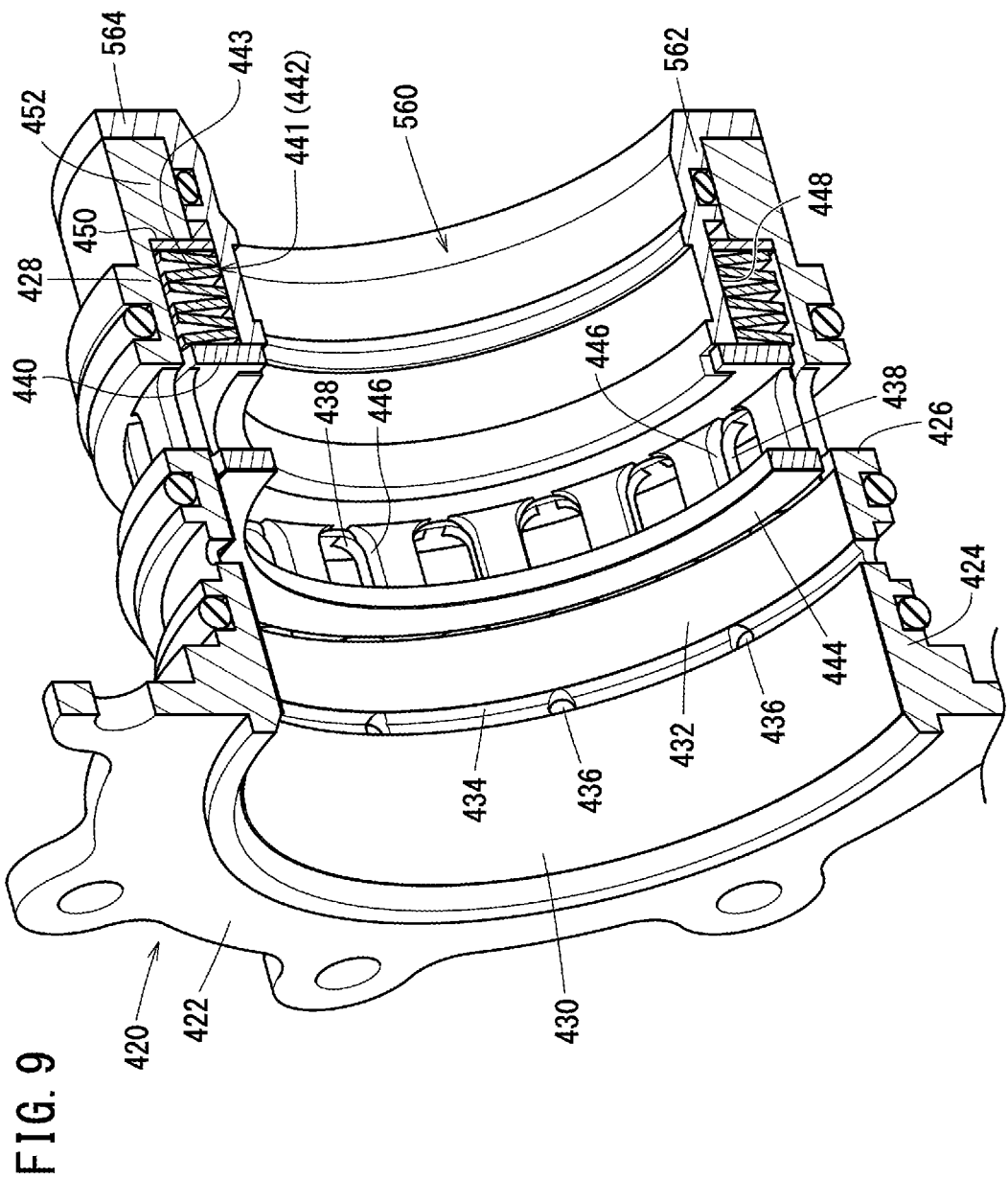
FIG. 9 is a schematic cross-sectional perspective view of a first bearing holder.

The first bearing 400 is retained in a hollow tubular shaped first bearing holder 420. As shown in FIG. 6 and FIG. 9, the first bearing holder 420 includes a first flange member 422 positioned at a first end and having a maximum outer diameter, a first cover member 424 that continues to a second end of the first flange member 422, a ring holder member 426, and a spring holder member 428. The first flange member 422 is connected to the first end of the first sub-housing 26 via bolts or the like. Consequently, the first bearing holder 420 is positioned and fixed to the rotating electric machine housing 22.

The first cover member 424 is positioned diametrically outward of the first outer ring 406. More specifically, the first cover member 424 covers the first bearing 400 from the outer circumferential surface side of the first outer ring 406. A first insulating element 430 and a second insulating element 432 are interposed between the outer circumferential surface of the first outer ring 406 and the inner circumferential surface of the first cover member 424. Due to the first insulating element 430 and the second insulating element 432, the first bearing 400 and the first bearing holder 420 are electrically insulated. In a typical example, the first insulating element 430 and the second insulating element 432 are insulating elements that are formed on the inner circumferential surface of the first cover member 424. Alternatively, the first insulating element 430 may be an insulating film that is formed on the outer circumferential surface of the first outer ring 406 of the first bearing 400. Alternatively, the first insulating element 430 and the second insulating element 432 may be rings that are made up from an insulator.

The first insulating element 430 and the second insulating element 432 are spaced apart from each other in the axial direction of the first bearing holder 420 via an annular shaped groove 434 that is formed in the first cover member 424. The annular shaped groove 434 is a groove that is recessed from the inner circumferential surface toward the outer circumferential surface of the first cover member 424, and further, extends along an outer circumferential surface of the first cover member 424. The annular shaped groove 434 faces toward the outer circumferential surface of the first outer ring 406 that makes up the first bearing 400. A plurality of first oil supply holes 436 are formed in a ceiling surface of the annular shaped groove 434. The plurality of first oil supply holes 436 extend in a manner so as to spread out in a radiating shape along a diametrical direction of the first cover member 424. Each of the first oil supply holes 436 communicates between the inner circumferential surface and the outer circumferential surface of the first cover member 424.

The ring holder member 426 includes a plurality of flow-through holes 438. The plurality of flow-through holes 438 are formed at intervals in the circumferential direction of the ring holder member 426 and penetrate from the inner circumferential surface to the outer circumferential surface of the ring holder member 426. A spacer ring 440, which is an intermediate member, is arranged on the inner circumferential side of the ring holder member 426. The spacer ring 440 is positioned and fixed on the inner circumference of the ring holder member 426.

The spacer ring 440 is interposed, in the axial direction of the first bearing holder 420, between an elastic body 442, which serves as a pressure applying member 441, and the first bearing 400. A third insulating element 444 is interposed between the second end surface of the first bearing 400, and a first end surface of the spacer ring 440. Typically, the third insulating element 444 is an insulating element that is formed on the first end surface of the spacer ring 440. Alternatively, the third insulating element 444 may be an insulating film that is formed on a second end surface of the first outer ring 406 of the first bearing 400. Alternatively, the third insulating element 444 may be a ring that is made up from an insulator.

A suitable example of the first insulating element 430, the second insulating element 432, and the third insulating element 444 is an alumina thermally sprayed film. However, the first insulating element 430, the second insulating element 432, and the third insulating element 444 may be an insulator made of a material other than alumina. Further, the film formation method of forming the first insulating element 430, the second insulating element 432, and the third insulating element 444 is not limited to thermal spraying. The film formation method may be a chemical vapor deposition (CVD) method, or a physical vapor deposition (PVD) method.

The spacer ring 440 includes a plurality of relay holes 446. The plurality of relay holes 446 are formed mutually at intervals in the circumferential direction of the spacer ring 440, and penetrate from the inner circumferential surface to the outer circumferential surface of the spacer ring 440. The relay holes 446 overlap the flow-through holes 438 on the inner circumferential side of the ring holder member 426. Accordingly, each of the relay holes 446 communicates with each of the first oil supply holes 436.

The spring holder member 428 retains the elastic body 442. In the illustrated example, the elastic body 442 is composed of a plurality of individual disc springs 443. The elastic body 442 may be a member that exhibits elasticity other than the disc springs 443. As another example of the elastic body 442, there may be cited coil springs.

Specifically, a tubular shaped guide portion 562 of the guide member 560 is inserted into the spring holder member 428. An accommodation chamber 448 is formed between the outer circumferential surface of the tubular shaped guide portion 562 of the guide member 560, and the inner circumferential surface of the spring holder member 428. The elastic body 442 (the plurality of disc springs 443) and a ring-shaped stopper 450 are gripped and held within the accommodation chamber 448. Moreover, a thick-walled portion 452 is provided at a second end of the spring holder member 428. A second end of one of the disc springs 443 abuts against a first end of the thick-walled portion 452 via the ring-shaped stopper 450. The disc springs 443 are compressed between the ring-shaped stopper 450 and a second end of the spacer ring 440.

The outer diameter of the first bearing 400 and the outer diameter of the disc springs 443 are approximately equal. Accordingly, the compressed disc springs 443 apply a load (an added pressure) to the second end surface of the first outer ring 406 via the spacer ring 440. The direction of the load is in the axial direction of the rotating shaft 66. In this manner, the disk springs 443 apply the load along the axial direction of the rotating shaft 66, to a side surface (the second end surface) of the first outer ring 406, facing in the axial direction of the rotating shaft 66.

The guide member 560 includes an outer flange member 564 having a larger diameter than the tubular shaped guide portion 562. The outer flange member 564 is exposed externally of the spring holder member 428. A second end surface of the spring holder member 428 abuts against a first end surface of the outer flange member 564.

Furthermore, the inner ring stopper 460 is inserted into the interior of the first bearing holder 420. A first end of the inner ring stopper 460 passes through the interior of the guide member 560 and the interior of the spacer ring 440, and reaches the first cover member 424. In the interior of the first cover member 424, the first end of the inner ring stopper 460 abuts against a second end surface of the first inner ring 402. In the foregoing manner, the first inner ring 402 of the first bearing 400 is sandwiched between the screw cap 220 and the inner ring stopper 460 in the axial direction of the outer shaft 70. Consequently, the first bearing 400 is positioned and fixed at a predetermined location on the outer circumferential surface of the outer shaft 70.

The first bearing chamber 410 extends along the axial direction (left-right direction) of the rotating shaft 66. The left end of the first bearing chamber 410 is separated farther away from an output shaft 964 than the right end of the first bearing chamber 410 is. Conversely, the right end of the first bearing chamber 410 is closer to the output shaft 964 than the left end of the first bearing chamber 410 is. Hereinafter, in the first bearing chamber 410, the left end which is separated farther away from the output shaft 964 than the right end may be referred to as a "first distal end 412". Further, the right end which is in closer to the output shaft 964 than the left end may be referred to as a "first proximal end 414".

As shown in FIG. 2 and FIG. 3, the first sub-housing 26 has an annular wall portion 462 at the first end. By the annular wall portion 462, an opening 463 and an internal space 464 are formed at the first end of the first sub-housing 26. Therefore, the first end of the first sub-housing 26 is an open end. Such an open end is closed by the resolver holder 56. Specifically, the resolver holder 56 includes a cylindrically shaped engaging member 466. The cylindrically shaped engaging member 466 is inserted into the internal space 464 of the annular wall portion 462 via the opening 463 at the first end of the first sub-housing 26. In this state, the resolver holder 56 is connected to the first sub-housing 26, for example, via mounting bolts (not shown). A space between an outer circumferential surface of the cylindrically shaped engaging member 466 and an inner circumferential surface of the annular wall portion 462 is sealed by a non-illustrated sealing member.

A shaft hole 470 is formed at a diametrical center of the resolver holder 56. An extending distal end of the extending portion 90 is passed through the shaft hole 470. At a first end of the resolver holder 56, the shaft hole 470 is closed by a cap cover 472. By being closed in this manner, the extending distal end of the extending portion 90 is blocked.

A resolver stator 216 is retained on an inner circumferential surface of the shaft hole 470. The resolver rotor 210 is positioned on an inner circumferential side of the resolver stator 216. More specifically, the resolver stator 216 surrounds the resolver rotor 210 on an outer circumferential side of the resolver rotor 210. The resolver 54 is constituted by the resolver stator 216 and the resolver rotor 210. The resolver 54 serves as the rotational parameter detector 50. According to the present embodiment, the resolver 54 detects an angle of rotation of the inner shaft 68. Moreover, as noted previously, the resolver rotor 210 is retained by the extending portion 90.

An engagement hole 474 is formed in the resolver holder 56. A transmission connector 218 is engaged with the engagement hole 474. The resolver stator 216 and the transmission connector 218 are electrically connected via a signal line 219. Moreover, a reception connector of a receiver (not shown) is inserted into the transmission connector 218. The resolver 54 and the receiver are electrically connected via the transmission connector 218 and the reception connector. The receiver receives signals emitted by the resolver 54.

Figure 10:
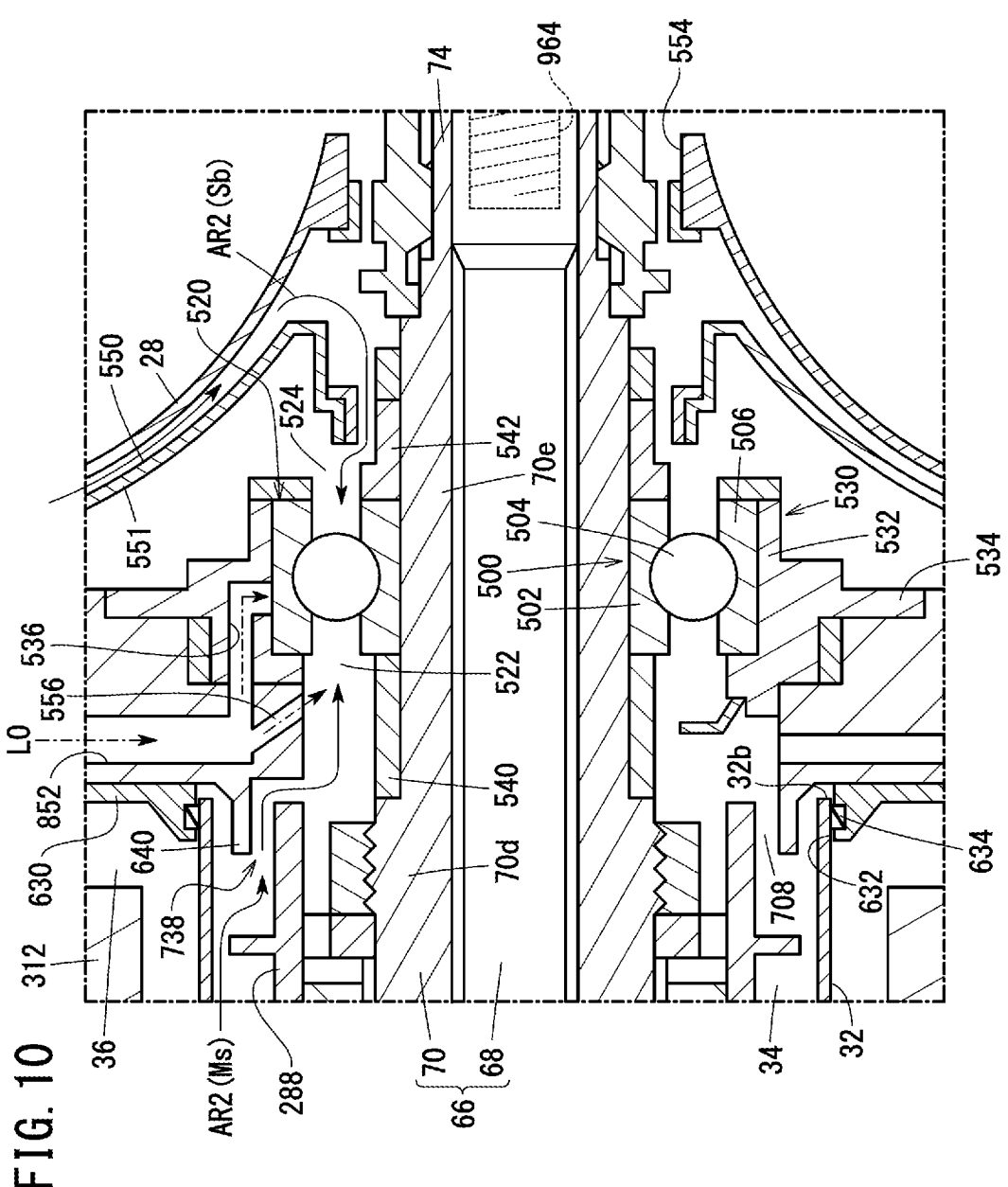
FIG. 10 is an enlarged cross-sectional view of main parts in the vicinity of a second bearing.

As shown in FIG. 2, FIG. 3, and FIG. 10, a second end of the rotating shaft 66 is rotatably retained in the main housing 24 via the second bearing 500. The second bearing 500 includes a second inner ring 502, second rolling balls 504, and a second outer ring 506. The entirety (the second inner ring 502, the second rolling balls 504, and the second outer ring 506) of the second bearing 500 is made up from a metal material.

A retaining concave portion 508 that is recessed toward the first end is formed at the second end of the main housing 24. A second bearing chamber 520 is formed by the retaining concave portion 508 of the main housing 24, and an inner chamber 512 of the second sub-housing 28 which is a hollow body. The second bearing 500 is accommodated in the second bearing chamber 520. Moreover, the retaining concave portion 508 communicates with the rotor chamber 34.

The second bearing chamber 520 extends along the axial direction (left-right direction) of the rotating shaft 66. The left end of the second bearing chamber 520 is separated farther away from the output shaft 964 than the right end of the second bearing chamber 520 is. Conversely, the right end of the second bearing chamber 520 is in closer to the output shaft 964 than the left end of the second bearing chamber 520 is. Hereinafter, in the second bearing chamber 520, the left end which is separated farther away from the output shaft 964 than the right end may be referred to as a "second distal end 522". Further, the right end which is in closer to the output shaft 964 than the left end may be referred to as a "second proximal end 524".

A second cover member 532 of a second bearing holder 530 is accommodated in the retaining concave portion 508. The second bearing holder 530 includes an outer flange member 534 that is extended in a diametrical outward direction from an outer circumferential surface of the second cover member 532. The outer flange member 534 is connected to the second end of the main housing 24 via bolts or the like. Consequently, the second bearing holder 530 is positioned and fixed to the rotating electric machine housing 22.

The second cover member 532 is positioned diametrically outward of the second outer ring 506, and covers the second bearing 500 from the outer circumferential surface side of the second outer ring 506. More specifically, the second bearing 500 is sandwiched between the outer circumferential surface of the second end of the outer shaft 70, and the inner circumferential surface of the second bearing holder 530.

A non-illustrated fourth insulating element is interposed between the outer circumferential surface of the second outer ring 506 and the inner circumferential surface of the second cover member 532. Due to the fourth insulating element, the second bearing 500 and the second bearing holder 530 are electrically insulated. In a typical example, the fourth insulating element is an insulating film that is formed on the inner circumferential surface of the second cover member 532. Alternatively, the fourth insulating element may be an insulating film that is formed on the outer circumferential surface of the second outer ring 506. Alternatively, the fourth insulating element may be a ring that is made up from an insulator.

A suitable example of the fourth insulating element is an alumina thermally sprayed film. However, the material of the fourth insulating element may be an insulator other than alumina. Further, the film formation method for forming the fourth insulating element is not limited to thermal spraying. The film formation method may be a chemical vapor deposition (CVD) method, or a physical vapor deposition (PVD) method.

An inner side inner ring stopper 540 and an outer side inner ring stopper 542 are inserted into the interior of the second bearing holder 530. The inner side inner ring stopper 540, the second inner ring 502, and the outer side inner ring stopper 542 are arranged in the fifth shaft portion 70e of the outer shaft 70 alongside one another in the axial direction of the rotating shaft 66. The inner side inner ring stopper 540 is positioned at the second distal end 522, and the outer side inner ring stopper 542 is positioned at the second proximal end 524. The second inner ring 502 is positioned between the inner side inner ring stopper 540 and the outer side inner ring stopper 542. By the second inner ring 502 being sandwiched between the inner side inner ring stopper 540 and the outer side inner ring stopper 542, the second bearing 500 is positioned and fixed at a predetermined location on the outer circumferential surface of the outer shaft 70.

A flow rectifying member 550 is accommodated in the inner chamber 512 of the second sub-housing 28. The flow rectifying member 550 is of a substantially truncated conical shape, and reduces in diameter in a tapered shape from a first end toward a second end thereof. An annular shaped portion 552 is provided on the second end of the flow rectifying member 550. By positioning and fixing the annular shaped portion 552 to the second end of the main housing 24, the flow rectifying member 550 is retained on the main housing 24.

A ventilation hole 554 is formed at a diametrical center of the flow rectifying member 550. The outer circumferential surface of the outer side inner ring stopper 542 faces in the diametrical direction toward the inner circumferential surface of the ventilation hole 554.

Next, a description will be given concerning the partition wall member 32 that partitions the interior of the rotating electric machine housing 22 into the rotor chamber 34 and the stator chamber 36.

The partition wall member 32 shown in FIG. 2 and FIG. 3 is a cylindrically shaped body. Accordingly, the partition wall member 32 surrounds a major portion of the rotor 62 from the outer circumferential side. Consequently, the rotor chamber 34 is formed in the interior of the partition wall member 32. The rotor 62 is accommodated in the rotor chamber 34.

On the other hand, a space is primarily formed between the outer circumferential surface of the partition wall member 32 and the inner circumferential surface of the main housing 24. Such a space makes up the stator chamber 36. The stator 64 is accommodated in the stator chamber 36. The inner circumferential surface of the main housing 24 and the electromagnetic coils 310 are slightly spaced apart from each other. More specifically, a clearance is formed between the inner circumferential surface of the main housing 24 and the electromagnetic coils 310. Due to this clearance, the main housing 24 and the electromagnetic coils 310 are electrically insulated.

In the case that the wall thickness of the partition wall member 32 is excessively large, the weight of the partition wall member 32 becomes greater, and further, the rotating electric machine 60 becomes enlarged along the diametrical direction. Further, the partition wall member 32 having such a large wall thickness interrupts the alternating magnetic field between the permanent magnets 282 and the electromagnetic coils 310. In order to avoid the problems described above, it is preferable for the wall thickness of the partition wall member 32 to be small. The wall thickness of the partition wall member 32, for example, is preferably around 1 mm.

Accordingly, even though it is thin-walled, the partition wall member 32 should preferably be made of a material having sufficient strength and rigidity. As a suitable example of such a material, there may be cited ceramics. In order to avoid interrupting the alternating magnetic field between the rotor 62 and the stator 64, insulating and non-magnetic ceramics are particularly preferred. As detailed examples thereof, there may be cited aluminum nitride (AlN), silicon nitride ($Si_3N_4$), and alumina ($Al_2O_3$). Among these ceramics, alumina is particularly preferred because it is inexpensive.

As will be discussed later, the compressed air AR, which is the gaseous coolant, flows through the rotor chamber 34 from the first end toward the second end. If the distance between the outer circumferential surfaces of the permanent magnets 282 and the inner circumferential surface of the partition wall member 32 is excessively small, turbulence is likely to occur in the compressed air AR, and therefore, windage loss becomes greater. In addition, since frictional resistance in the rotor 62 with respect to the compressed air AR becomes greater, frictional heat generated in the permanent magnets 282 also becomes greater. In order to avoid the problems described above, it is preferable for the distance between the outer circumferential surfaces of the permanent magnets 282 and the inner circumferential surface of the partition wall member 32 to be larger than the distance between the outer circumferential surface of the partition wall member 32 and the electromagnetic coils 310. The value of the former is preferably set to be approximately 2.5 times to approximately 4 times the value of the latter. To cite one example of a combination of the former and the latter, the value of the former lies within a range of from 1.1 mm to 2.1 mm, and the value of the latter lies within a range of from 0.3 mm to 0.5 mm.

A tubular shaped portion 600, which is one portion of the bearing retaining member 27, is inserted into a first end of the partition wall member 32. An inner circumferential surface of the tubular shaped portion 600 and an outer circumferential surface of the spring holder member 428 in the first bearing holder 420 are air-tightly and liquid-tightly sealed by a sealing member. A partition member 610 is interposed between a second end of the first sub-housing 26 and a first end of the stator 64. The partition member 610 includes a first wall surface 612 facing toward the second end, and a second wall surface 614 facing toward the first end. More specifically, the second wall surface 614 is a rear surface of the first wall surface 612. Moreover, it should be noted that the partition member 610 is a separate member from the first sub-housing 26 and the main housing 24.

The partition member 610 shown in FIG. 7 reduces in a substantially tapered shape from the first end toward the second end. An annular shaped edge part 616 (a side wall) having the largest diameter and a predetermined wall thickness is positioned on a first end of the partition member 610. The annular shaped edge part 616 is accommodated on an inner circumferential side of an annular shaped wall member 25 provided on a second end surface of the first sub-housing 26. An annular shaped third sealing member 618 is provided on the side wall of the annular shaped edge part 616. The third sealing member 618, by abutting against the inner circumferential surface of the annular shaped wall member 25, partitions a gaseous coolant flow path 700 and the stator chamber 36 in an air-tight and liquid-tight manner. An inner circumferential surface of the annular shaped edge part 616 and an outer circumferential surface of the annular shaped wall member 25 are slightly separated from each other.

The partition member 610 includes a tubular portion 620 (in particular, refer to FIG. 7) at a second end thereof. A left insertion hole 622 is formed in the tubular portion 620. The first end of the partition wall member 32 is inserted into the left insertion hole 622. An annular shaped first sealing member 624 is provided on the inner circumferential surface of the left insertion hole 622. The first sealing member 624, by abutting against the outer circumferential surface of the first end of the partition wall member 32, partitions the gaseous coolant flow path 700 and the stator chamber 36 in an air-tight and liquid-tight manner. The inner circumferential surface of the tubular portion 620, and the outer circumferential surface of the first end of the partition wall member 32 are slightly separated away from each other.

In the partition member 610, a portion thereof between the annular shaped edge part 616 (the first end) and the tubular portion 620 (the second end) is a portion that gradually expands in diameter from the second end toward the first end. Hereinafter, this portion will be referred to as an expanded diameter portion 626. The expanded diameter portion 626 may include a portion whose diameter expands in diameter in a stepwise manner. The first wall surface 612 is a surface in the expanded diameter portion 626 that faces toward the second end. The second wall surface 614 is a surface in the expanded diameter portion 626 that faces toward the first end.

As shown in FIG. 10, the second sub-housing 28 has a seal installation portion 630. The seal installation portion 630 projects out toward the first end from a first end surface of the second sub-housing 28. The seal installation portion 630 includes a right insertion hole 632 that forms an air distribution pathway 702. An annular shaped second sealing member 634 is provided on the inner circumferential surface of the right insertion hole 632. Accordingly, when the second end of the partition wall member 32 is inserted into the right insertion hole 632, the second sealing member 634 abuts against an outer circumferential surface of a second end of the partition wall member 32. Consequently, the second sealing member 634 air-tightly and liquid-tightly partitions the gaseous coolant discharge passage (the air distribution pathway 702 shown in FIG. 2) through which the gaseous coolant is discharged from the partition wall member 32, and the stator chamber 36. The inner circumferential surface of the right insertion hole 632, and the outer circumferential surface of the second end of the partition wall member 32 are slightly separated away from each other.

In the foregoing manner, due to the presence of the third sealing member 618, the first sealing member 624, and the second sealing member 634, the rotor chamber 34 and the stator chamber 36 become spaces that are independent from each other. Accordingly, for example, the gaseous coolant (the compressed air AR) supplied to the rotor chamber 34 is prevented from leaking into the stator chamber 36. Further, the liquid coolant (the cooling oil CO) supplied to the stator chamber 36 is also prevented from leaking into the rotor chamber 34.

A tubular shaped convex portion 640, which is formed at the first end of the main housing 24, is inserted into the second end of the partition wall member 32. The tubular shaped convex portion 640 and an inner circumferential surface of the seal installation portion 630 face toward each other with the second end of the partition wall member 32 positioned therebetween.

As can be understood from the foregoing, by being inserted into the left insertion hole 622 of the tubular portion 620 of the partition member 610, the first end of the partition wall member 32 is supported on the first sub-housing 26 via the partition member 610. Further, by being inserted into the right insertion hole 632 of the seal installation portion 630 of the second sub-housing 28, the second end of the partition wall member 32 is supported on the second sub-housing 28. The partition wall member 32 does not come into abutment in particular with any other members. Further, in the illustrated example, a member does not exist that is in contact with a distal end surface 32a of the first end of the partition wall member 32, and a member does not exist that is in contact with a distal end surface 32b of the second end of the partition wall member 32. Stated otherwise, in the partition wall member 32, both of the distal end surfaces 32a and 32b in the axial direction are unconstrained surfaces that are not constrained by other members. Therefore, both end parts of the partition wall member 32 can be freely made to undergo thermal expansion in the axial direction of the partition wall member 32.

Moreover, although according to this aspect, both of the distal end surfaces 32a and 32b are unconstrained surfaces, some other members may be placed in contact with either the distal end surface 32a or the distal end surface 32b.

A description will be given concerning the partition member 610 that supports the first end of the partition wall member 32.

The inner surface of the stator chamber 36 includes the first wall surface 612 of the partition member 610, the outer circumferential surface of the partition wall member 32, and the inner circumferential surface of the main housing 24. More specifically, the first wall surface 612 of the partition member 610 forms one portion of the inner surface of the stator chamber 36. On the other hand, between the second wall surface 614 of the partition member 610 and the second end surface of the first sub-housing 26, there is provided the gaseous coolant flow path 700 through which the compressed air AR, which is the gaseous coolant, flows. Accordingly, the second wall surface 614 forms one portion of the inner surface of the gaseous coolant flow path 700.

The gaseous coolant flow path 700 includes a downstream side end part 704 that is maximally downstream in the flow direction of the compressed air AR. In the partition wall member 32, the compressed air AR that has flowed out from the downstream side end part 704 flows into the rotor chamber 34 from the opening at the first end that is inserted into the left insertion hole 622. More specifically, the opening at the first end of the partition wall member 32 is an inlet (a coolant inlet 706) by which the compressed air AR flows into the rotor chamber 34. Moreover, one portion of the compressed air AR flows within the rotor chamber 34 along the axial direction of the rotating shaft 66. Accordingly, the opening at the second end of the partition wall member 32 is an outlet (a coolant outlet 708) by which the compressed air AR flows out from the rotor chamber 34.

As noted previously, the partition member 610 includes the expanded diameter portion 626 that gradually expands in diameter between the annular shaped edge part 616 (the first end) and the tubular portion 620 (the second end) from the second end toward the first end. In the expanded diameter portion 626, a concave portion 627 is formed that is recessed from the second end toward the first end of the rotating shaft 66. A bottom surface 628 of the concave portion 627 is one portion in the circumferential direction of the first wall surface 612. The concave portion 627 is formed, for example, within a range of 45° to 90° in the circumferential direction of the first wall surface 612. The concave portion 627 faces toward an end part in the axial direction of the coil end portion 314. As can be understood from this feature, one portion of the first wall surface 612 faces toward the end part in the axial direction of the coil end portion 314.

The shape of the bottom surface 628 of the concave portion 627 corresponds to the shape of the neutral point terminal 320 that is disposed inside the concave portion 627. In the illustrated example, the bottom surface 628 of the concave portion 627 includes a second curved surface 319b that is curved corresponding to the shape of a first curved surface 319a of the neutral point terminal 320.

The bottom surface 628 of the concave portion 627 and the neutral point terminal 320 are separated away from each other by a predetermined space. When the liquid coolant flows inside the stator chamber 36, one portion of the liquid coolant passes between the bottom surface 628 of the concave portion 627 and the neutral point terminal 320. More specifically, the interval between the bottom surface 628 of the concave portion 627 and the neutral point terminal 320 forms one portion of a liquid coolant flow path.

In FIG. 7, in the expanded diameter portion 626, a portion thereof where the concave portion 627 is not provided is shown by a virtual line. As understood from FIG. 7, provisionally, in the case that the portion of the expanded diameter portion 626 where the concave portion 627 is not provided and the neutral point terminal 320 were to face toward each other, the expanded diameter portion 626 would interfere with the neutral point terminal 320.

As shown in FIG. 1, the first casing 40 and the second casing 42 are integrally provided on the side circumferential surface in the vicinity of a left end of the main housing 24. A U-phase terminal 151a, a V-phase terminal 151b, and a W-phase terminal 151c are accommodated in the terminal chamber 46 of the first casing 40. The U-phase terminal 151a is electrically connected to a U-phase coil among the electromagnetic coils 310. The V-phase terminal 151b is electrically connected to a V-phase coil among the electromagnetic coils 310. The W-phase terminal 151c is electrically connected to a W-phase coil among the electromagnetic coils 310. The U-phase terminal 151a, the V-phase terminal 151b, and the W-phase terminal 151c are electric terminal portions to which an external device (an external load or an external power source) is electrically connected. Electrical power generated by the rotating electric machine 60 is supplied to the external device. As the external load, for example, there may be cited a non-illustrated motor. As another external device, for example, there may be cited a non-illustrated battery.

An electrical contact between the U-phase terminal 151*a* and the U-phase coil is provided in the contact chamber 44 of the first casing 40. An electrical contact between the V-phase terminal 151*b* and the V-phase coil is similarly provided in the contact chamber 44. An electrical contact between the W-phase terminal 151*c* and the W-phase coil is similarly provided in the contact chamber 44. When describing the electrical contact between the V-phase terminal 151*b* and the V-phase coil, as shown in FIG. 2, the V-phase terminal 151*b* includes a blocking convex portion 294. The blocking convex portion 294 closes and blocks a communication opening between the contact chamber 44 and the terminal chamber 46. Due to being blocked in this manner, the contact chamber 44 and the terminal chamber 46 become spaces that are independent from each other.

A terminal portion 295 of the V-phase terminal 151*b* is provided on the blocking convex portion 294. The terminal portion 295 extends into the contact chamber 44. Further, a terminal wire 298, which is an end part of the V-phase coil, is led out to the contact chamber 44. Inside the contact chamber 44, the terminal portion 295 and the terminal wire 298 is connected via screws 296. In accordance with this feature, the V-phase terminal 151*b* and the V-phase coil are electrically connected. Although not shown in particular, the U-phase terminal 151*a* and the U-phase coil are similarly connected inside the contact chamber 44. In the same manner, the W-phase terminal 151*c* and the W-phase coil are connected inside the contact chamber 44.

As shown in FIG. 1, the second casing 42 is adjacent to the first casing 40. A thermistor 152, which serves as a temperature measurement device, is accommodated in the second casing 42. Although not illustrated in particular, measurement terminals of the thermistor 152 are connected to the electromagnetic coils 310 after having been drawn out from the second casing 42. A harness 149 that is connected to the thermistor 152 is drawn out from the second casing 42.

In the rotating electric machine system 20 which is configured in the manner described above, there are provided an air coolant flow path 730 (refer to FIG. 2) that includes the gaseous coolant flow path 700, a first oil coolant flow path 800 (see FIG. 2), a second oil coolant flow path 840 (refer to FIG. 3), and a third oil coolant flow path 870 (refer to FIG. 3). Initially, a description will be given concerning the air coolant flow path 730.

As shown in FIG. 2, the air coolant flow path 730 includes an air supply passage 732, the gaseous coolant flow path 700, a first branching passage 734, a first drain passage 736, a second branching passage 738, and a second drain passage 740. An air supply port serving as an inlet to the air supply passage 732 is provided on a side circumferential surface of the first sub-housing 26. In this instance, for example, one portion of the compressed air AR (bleed air) generated in the gas turbine engine 950 is supplied to the air supply port. Moreover, the compressed air AR, which is obtained by compressing the atmosphere by means of a compressor, may be supplied to the air supply port. Alternatively, a compressed gas may be supplied to the air supply port from an oxygen cylinder or a nitrogen cylinder.

As shown in FIG. 2, the air supply passage 732 is formed in the interior of the second sub-housing 28. The air supply passage 732 extends from the side circumferential surface of the first sub-housing 26 toward the interior of the first sub-housing 26. The gaseous coolant flow path 700 is inclined from the first end toward the second end, as the flow path proceeds from the side circumferential surface of the first sub-housing 26 toward the interior of the first sub-housing 26. Moreover, although in FIG. 2 a configuration is illustrated in which one air supply passage 732 is formed, a plurality of air supply passages 732 may be formed therein.

As noted previously, the gaseous coolant flow path 700 is a space formed between the second end surface of the first sub-housing 26 and the second wall surface 614 of the partition member 610. The diameter of the expanded diameter portion 626 of the partition member 610 becomes smaller toward the second end. Accordingly, as the compressed air AR, which is a gaseous coolant, flows downstream through the gaseous coolant flow path 700, the gaseous coolant moves toward the diametrical center of the rotating electric machine housing 22.

The downstream side end part 704 of the gaseous coolant flow path 700 lies between the inner surface of a base end of the first end side of the tubular portion 620, and the outer surface of the tubular shaped portion 600 of the first sub-housing 26. Since the partition wall member 32 is inserted into the left insertion hole 622 of the tubular portion 620 of the partition member 610, the compressed air AR that has flowed out of the downstream side end part 704 flows into the rotor chamber 34 from the coolant inlet 706 that is formed at the first end of the partition wall member 32.

As shown in FIG. 2, one portion of the compressed air AR is blocked by the first magnet stopper 286. As a result, the one portion of the compressed air AR is directed toward the first bearing 400. The remaining portion of the compressed air AR passes through a clearance formed between the first magnet stopper 286 and the partition wall member 32, and flows along the axial direction inside the rotor chamber 34. More specifically, the remaining portion of the compressed air AR is directed toward the second bearing 500. Hereinafter, the compressed air AR directed toward the first bearing 400 will be referred to as a "first branched air flow AR1", and the compressed air AR directed toward the second bearing 500 will be referred to as a "second branched air flow AR2". The first branching passage 734 is a flow through pathway of the first branched air flow AR1, and the second branching passage 738 is a flow through pathway of the second branched air flow AR2.

As shown in FIG. 2 and FIG. 6, the first branching passage 734 includes a space formed between a first end surface of the first magnet stopper 286 and a second end surface of the guide member 560, and a clearance formed between the inner ring stopper 460 and the guide member 560. As can be understood from this feature, the first proximal end 414 of the first bearing chamber 410 forms the first branching passage 734. Due to the first branched air flow AR1 that has reached the first proximal end 414, an air curtain is formed with respect to the first bearing 400.

The first branching passage 734 communicates with the relay holes 446 of the spacer ring 440 via the internal space of the spacer ring 440. The relay holes 446 overlap with the flow-through holes 438 that are formed in the ring holder member 426 of the first bearing holder 420. Accordingly, the first branched air flow AR1 passes through the first branching passage 734, the relay holes 446, and the flow-through holes 438, and flows into the space between the ring holder member 426 and the first sub-housing 26.

The first drain passage 736 includes a first guidance passage 742 that is a gaseous coolant guidance passage, the internal space 464, a second guidance passage 744, and a merging flow path 746. An inlet to the first guidance passage 742 is formed in the first sub-housing 26 at a location facing toward the flow-through holes 438 of the first bearing holder 420. It should be noted that the number of the first drain passage 736 is not particularly limited, but is typically from one to three. An outlet of the first guidance passage 742 opens toward the internal space 464. Therefore, the first guidance passage 742 communicates with the internal space 464 via the outlet.

As noted previously, the internal space 464 is a space surrounded by the annular wall portion 462 of the first sub-housing 26, and further, which is closed by the resolver holder 56. The second guidance passage 744 is formed at the lower part of the first sub-housing 26 and extends downward in a straight line shape. An outlet of the second guidance passage 744 opens toward the internal space 464.

The merging flow path 746 is perpendicular with respect to the second guidance passage 744 and extends along the axial direction. An inlet of the merging flow path 746 opens toward the second guidance passage 744.

The second branching passage 738 includes one portion of the rotor chamber 34. In the rotor chamber 34, the second branching passage 738 is primarily formed between the outer circumferential surfaces of the permanent magnets 282 and the inner circumferential surface of the partition wall member 32. As noted previously, the opening at the second end of the partition wall member 32 is the coolant outlet 708 by which the compressed air AR flows out from the rotor chamber 34.

The tubular shaped convex portion 640 of the main housing 24 is inserted into the interior of the second end of the partition wall member 32. In this instance, the main housing 24 includes in the interior thereof the air distribution pathway 702 (the gaseous coolant discharge passage) as shown in FIG. 2. An inlet to the air distribution pathway 702 is formed in the tubular shaped convex portion 640. More specifically, the inlet to the air distribution pathway 702 is disposed in facing relation to the coolant outlet 708. Therefore, one portion of the second branched air flow AR2 flows into the air distribution pathway 702. Hereinafter, the compressed air AR that has flowed into the air distribution pathway 702 will be referred to as a "branched air flow Sb". One portion of the branched air flow Sb passes between an inner surface that forms the inner chamber 512 of the second sub-housing 28, and an outer surface of the flow rectifying member 550, and reaches the second proximal end 524 of the second bearing chamber 520. The remainder of the branched air flow Sb passes through an annular shaped circulation space formed between the second sub-housing 28 and the outer shaft 70, and is discharged to the exterior of the rotating electric machine housing 22.

The second branching passage 738 further includes the clearance between the second magnet stopper 288 and the partition wall member 32, and the second distal end 522 of the second bearing chamber 520. More specifically, at the second distal end 522 of the second bearing chamber 520, the remaining portion of the second branched air flow AR2 flows in between the second bearing holder 530 and the inner side inner ring stopper 540. Moreover, in order to simplify the description, hereinafter, the remaining portion of the second branched air flow AR2 that flows through the second branching passage 738 will be referred to as a "main air flow Ms".

As noted previously, the main air flow Ms is supplied to the second distal end 522 of the second bearing chamber 520, and the branched air flow Sb is supplied to the second proximal end 524 of the second bearing chamber 520. More specifically, the second bearing 500 is surrounded by the second branched air flow AR2. As a result, an air curtain is formed with respect to the second bearing 500.

Alternatively, another compressed air supply passage may be formed in the second sub-housing 28. In such a configuration, it is also possible to supply the compressed air AR to the second proximal end 524 via another compressed air supply passage.

The second branched air flow AR2 that is supplied excessively to the second bearing chamber 520 is guided by an inner surface 551 of the flow rectifying member 550, and is led toward the inlet of the second drain passage 740 that is formed at a lower portion of the main housing 24. The second drain passage 740 extends downwardly in the interior of the main housing 24. The merging flow path 746 communicates perpendicularly with the second drain passage 740. Accordingly, the first branched air flow AR1 and the second branched air flow AR2 (the main air flow Ms and the branched air flow Sb) merge together in the second drain passage 740, and flow out externally of the rotating electric machine housing 22.

Figure 11:
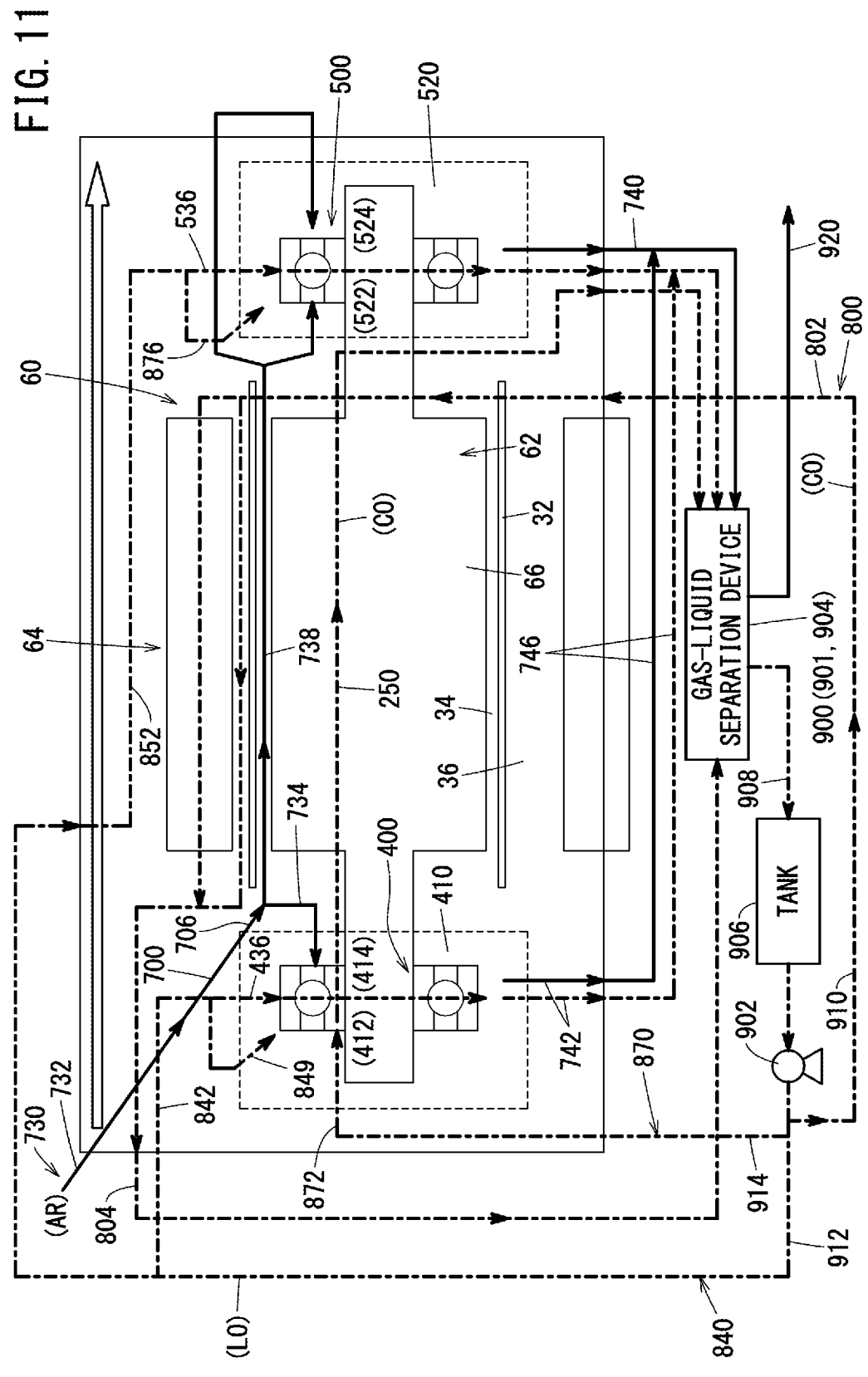
FIG. 11 is a schematic flow diagram showing flow through pathways of a gaseous coolant and a liquid coolant.

As shown in FIG. 11, the compressed air AR that is discharged from the second drain passage 740 is recovered in a gas-liquid separation device 900. As will be discussed later, the compressed air AR and the cooling oil CO or the lubricating oil LO are separated in the gas-liquid separation device 900. The compressed air AR from which the oil has been separated is discharged from the gas-liquid separation device 900 into the atmosphere. The gas-liquid separation device 900 serves as an oil recovery device 901, and further, together with a later-described circulation pump 902, constitutes the oil supplying device 904. In this manner, the gas-liquid separation device 900 serves as both the oil recovery device 901, and one portion of the oil supplying device 904.

The first oil coolant flow path 800 is a flow path in order to circulate and supply the cooling oil CO into the stator chamber 36. The first oil coolant flow path 800 includes a first oil supply passage 802 that is connected to a tank 906, the stator chamber 36, and a stator chamber side drain passage 804. The first oil supply passage 802 is disposed in close proximity to the second end of the main housing 24. The stator chamber side drain passage 804 is disposed on the side part of the first casing 40. The first oil supply passage 802 communicates with the stator chamber 36, and the stator chamber 36 communicates with the contact chamber 44 of the first casing 40 (refer to FIG. 2). The contact chamber 44 communicates with the stator chamber side drain passage 804. Accordingly, the cooling oil CO supplied from the tank 906 to the first oil supply passage 802, after having passed through the stator chamber 36, flows into the contact chamber 44.

Furthermore, the cooling oil CO is returned from the contact chamber 44 to the tank 906 via the stator chamber side drain passage 804. The cooling oil CO in the tank 906 is resupplied to the first oil supply passage 802 via a first return pipe 910. Moreover, the cooling oil CO that flows through the stator chamber side drain passage 804 may be delivered to the gas-liquid separation device 900, and thereafter, delivered from the gas-liquid separation device 900 to the tank 906. The latter feature is illustrated in FIG. 11.

The second oil coolant flow path 840 is a flow path in order to circulate and supply the lubricating oil LO to the first bearing 400 and the second bearing 500. A second oil supply passage 842 is formed at an upper part of the first sub-housing 26. The second oil supply passage 842 extends from the exterior in the diametrical direction toward the interior in the diametrical direction of the first sub-housing 26. In this instance, a holder spacer 844 (refer to FIG. 6) is sandwiched between the first sub-housing 26 and the first cover member 424 of the first bearing holder 420. A plurality of communication holes 846 are formed along the circumferential direction in the holder spacer 844. The second oil supply passage 842 communicates with the first oil supply holes 436 via the communication holes 846. Accordingly, one portion of the lubricating oil LO is supplied to the first outer ring 406 of the first bearing 400 via the second oil supply passage 842, the communication holes 846, and the first oil supply holes 436.

An oil distribution passage 849 that is formed in a first nozzle member 848 (refer to FIG. 3) is connected to the second oil supply passage 842. Accordingly, a remaining portion of the lubricating oil LO flows through the oil distribution passage 849, and is discharged from a discharge portion 850 that is provided in the first nozzle member 848 into the first distal end 412 of the first bearing chamber 410.

The first drain passage 736 including the internal space 464 is formed at a lower portion of the first sub-housing 26. As noted previously, the lubricating oil LO supplied to the first bearing 400, after having passed through the first drain passage 736, flows out to the exterior of the rotating electric machine housing 22 via the second drain passage 740. The lubricating oil LO discharged from the second drain passage 740 is recovered by the gas-liquid separation device 900. The lubricating oil LO discharged from the gas-liquid separation device 900 passes through the gas-liquid separation device 900 and the tank 906, and then is returned to the second oil supply passage 842 via a second return pipe 912 that is connected to the second oil supply passage 842.

In the second oil supply passage 842, a third oil supply passage 852 crosses perpendicularly at a more upstream location than the oil distribution passage 849. At the second end of the main housing 24, the third oil supply passage 852 is bent in a manner so as to face in a diametrically inward direction. The third oil supply passage 852 is connected to a second oil supply hole 536 that is formed in the second bearing holder 530. Accordingly, the lubricating oil LO that is distributed from the second oil supply passage 842 to the third oil supply passage 852 is supplied via the second oil supply hole 536 to the second outer ring 506 of the second bearing 500. Moreover, for example, a preliminary oil supply passage 853 may be formed in the main housing 24, and the lubricating oil LO may be supplied to the second bearing holder 530 from the preliminary oil supply passage 853.

The second drain passage 740 that communicates with the second bearing chamber 520 is formed at a lower portion of the first sub-housing 26. As noted previously, the lubricating oil LO supplied to the second bearing 500 flows out to the exterior of the rotating electric machine housing 22 via the second drain passage 740. In this manner, the second drain passage 740 also serves as an oil discharge passage. The lubricating oil LO discharged from the second drain passage 740 is recovered by the gas-liquid separation device 900. The lubricating oil LO discharged from the gas-liquid separation device 900 passes through the tank 906, and then is returned to the second oil supply passage 842 via the second return pipe 912 that is connected to the second oil supply passage 842.

The third oil coolant flow path 870 is a flow path in order to circulate and supply the cooling oil Co into the rotor internal flow path 250. More specifically, the third oil coolant flow path 870 includes a fourth oil supply passage 872 that is connected to the gas-liquid separation device 900 via a third return pipe 914, the rotor internal flow path 250, and the second drain passage 740 that is connected to the tank 906. The fourth oil supply passage 872 is disposed on a lower part of the first sub-housing 26. An oil guidance passage 876 that is formed in a second nozzle member 874 is connected to the fourth oil supply passage 872. Accordingly, the cooling oil CO flows through the oil guidance passage 876, and is discharged from a discharge portion 878 provided in the second nozzle member 874 toward the first shaft portion 70a.

The cooling oil CO passes through the annular shaped flow through spaces 252 of the screw cap 220, and flows through the groove shaped flow paths 230 that are covered by the first inner ring 402 of the first bearing 400. Furthermore, the cooling oil CO passes through the guide flow paths 232, a flow through space between the outer shaft 70 and the inner ring stopper 460, a flow through space between the outer shaft 70 and the first magnet stopper 286, a flow through space between the outer shaft 70 and the magnet holder 280, and a flow through space between the outer shaft 70 and the second magnet stopper 288, and reaches the second distal end 522 of the second bearing chamber 520.

The cooling oil CO that has flowed through the rotor internal flow path 250 merges with the lubricating oil LO at the second drain passage 740. Thereafter, the cooling oil CO, in the same manner as the lubricating oil LO, flows out to the exterior of the rotating electric machine housing 22 via the second drain passage 740. The cooling oil CO discharged from the second drain passage 740 is recovered by the gas-liquid separation device 900. The cooling oil CO discharged from the gas-liquid separation device 900 passes through the tank 906, and then is returned to the fourth oil supply passage 872 via the third return pipe 914.

Moreover, it should be noted that it is also possible to make use of both the lubricating oil LO and the cooling oil Co that flow through the rotor internal flow path 250. In this case, for example, the lubricating oil LO which is supplied to the second oil supply passage 842 is distributed to the first nozzle member 848 and the second nozzle member 874.

An oil delivery passage 908 in which the tank 906 and the circulation pump 902 are provided is connected to the gas-liquid separation device 900 shown in FIG. 11. The oil stored in the tank 906 is delivered by the circulation pump 902 to the first return pipe 910, the second return pipe 912, and the third return pipe 914 that are connected to the circulation pump 902. In the foregoing manner, the oil delivered to the first return pipe 910 is supplied to the stator chamber 36 as the cooling oil CO via the first oil supply passage 802. The oil delivered to the second return pipe 912 passes through the second oil supply passage 842 and the third oil supply passage 852, and is supplied respectively to the first bearing 400 and the second bearing 500 as the lubricating oil LO. The oil delivered to the third return pipe 914 is supplied to the rotor internal flow path 250 as the cooling oil CO via the fourth oil supply passage 872.

A recovery passage is connected to the gas-liquid separation device 900. The compressed air AR, the cooling oil CO, and the lubricating oil LO that pass through the second drain passage 740 and are discharged from the rotating electric machine housing 22 pass through the recovery passage and flow into the gas-liquid separation device 900. In the foregoing manner, the gas-liquid separation device 900 serves to separate the compressed air AR and the oil. The compressed air AR is discharged to the atmosphere via an exhaust line 920. On the other hand, the oil is temporarily stored in the tank 906. Thereafter, the lubricating oil LO is drawn in from the tank 906 by the circulation pump 902, and is delivered to the first return pipe 910, the second return pipe 912, and the third return pipe 914. By the foregoing process being repeated, the oil inside the tank 906 is circulated and supplied as the lubricating oil LO or the cooling oil CO.

The rotating electric machine system 20 is basically configured as described above. Moreover, it should be noted that the configuration of the gas turbine engine 950, for example, is similar to the configuration shown in FIG. 8 of JP 2022-157789 A. Therefore, the description of the gas turbine engine 950 will be kept brief.

The gas turbine engine 950 includes an engine housing 952. The engine housing 952 includes an inner housing 954 and an outer housing 956. The inner housing 954 is connected to the second sub-housing 28 of the rotating electric machine system 20. The outer housing 956 is connected to the inner housing 954.

The inner housing 954 has a plurality of individual leg members 958. In the illustrated example, the number of the leg members 958 is six. However, the number of the leg members 958 is determined in accordance with the necessary coupling strength required between the gas turbine engine 950 and the rotating electric machine system 20. Stated otherwise, the number of the leg members 958 is not limited to being six as in the illustrated example. An air intake space 960 is formed between the leg members 958.

The gas turbine engine 950 is equipped with the output shaft 964 that is coupled to the rotating shaft 66. A non-illustrated compressor wheel and a non-illustrated turbine wheel are mounted diametrically outward of the output shaft 964. The compressor wheel and the turbine wheel are capable of rotating integrally together with the rotating shaft 66 and the output shaft 964.

Next, a description will be given concerning operations of the combined power system 10.

First, an alternating current is supplied to the plurality of electromagnetic coils 310 (the U-phase coil, the V-phase coil, and the W-phase coil) via the U-phase terminal 151*a*, the V-phase terminal 151*b*, and the W-phase terminal 151*c*. By the alternating current flowing through the electromagnetic coils 310, an alternating magnetic field is generated in the stator 64. Therefore, an attractive force and a repulsive force act alternately between the electromagnetic coils 310 and the permanent magnets 282 of the rotor 62. As a result, the rotating shaft 66 begins to rotate. Alternatively, the rotating shaft 66 may be rotated by a well-known type of starter (not shown).

A rotational torque of the rotating shaft 66 is transmitted to the output shaft 964 via the compressor wheel. More specifically, when the rotating shaft 66 begins to rotate, the output shaft 964 also starts rotating integrally together with the rotating shaft 66. Along therewith, the compressor wheel and the non-illustrated turbine wheel, which are supported on the output shaft 964, rotate integrally together with the output shaft 964.

After the gas turbine engine 950 has been started in the manner described above, the output shaft 964 rotates accompanying the driving of the gas turbine engine 950. Accordingly, even if the supply of the electrical current to the electromagnetic coils 310 is stopped, the rotating shaft 66 rotates integrally together with the output shaft 964.

Since the rotating shaft 66 retains the permanent magnets 282, the alternating current is generated in the electromagnetic coils 310 that surround the permanent magnets 282. Via the U-phase terminal, the V-phase terminal, and the W-phase terminal, the alternating current is delivered to a non-illustrated current converter. By the current converter, the alternating current is converted into a direct current. When a non-illustrated control circuit has determined that the output of the external load electrically connected to the battery has decreased, the current converter supplies the direct current to the battery. Consequently, charging is carried out on the battery.

By the output shaft 964 undergoing rotation, atmospheric air is drawn into the engine housing 952 via the air intake space 960 provided between the leg members 958 of the inner housing 954. In this instance, the second sub-housing 28 of the rotating electric machine system 20 exhibits a mountain shape or a chevron shape in a manner so as to decrease in diameter as it proceeds from the main housing 24 toward the engine housing 952. Therefore, the drawn-in atmospheric air is rectified by the second sub-housing 28 and flows in a manner so as to be directed toward the engine housing 952. Since the second end of the second sub-housing 28 is inserted into the opening at the first end of the engine housing 952, the atmospheric air is efficiently guided into the engine housing 952.

The atmospheric air that is drawn into the engine housing 952 is compressed by the compressor wheel. In accordance therewith, the compressed air AR is generated. One portion of this compressed air AR is supplied to the air coolant flow path 730 of the rotating electric machine system 20.

Specifically, the compressed air AR flows into the air supply passage 732 via the air supply port provided on the side circumferential surface of the first sub-housing 26. The compressed air AR passes through the air supply passage 732, and flows into the gaseous coolant flow path 700 that is formed between the second end surface of the first sub-housing 26 and the second wall surface 614 of the partition member 610. The compressed air AR moves through the gaseous coolant flow path 700 toward the rotor chamber 34 in the interior of the rotating electric machine housing 22. In this manner, the direction in which the compressed air AR flows in the gaseous coolant flow path 700 is from the exterior in the diametrical direction toward the interior in the diametrical direction of the rotating electric machine housing 22.

Furthermore, the compressed air AR flows into the rotor chamber 34 from the downstream side end part 704 of the gaseous coolant flow path 700 via the coolant inlet 706 of the rotor chamber 34. In the rotor chamber 34, the compressed air AR is divided into the first branched air flow AR1 and the second branched air flow AR2 with the first magnet stopper 286 serving as a boundary therebetween. The first branched air flow AR1 reaches the first proximal end 414 of the first bearing chamber 410 along the first branching passage 734, and forms an air curtain at the first proximal end 414. In this manner, the direction in which the first branched air flow AR1 is supplied to the first bearing chamber 410 is a second direction from the permanent magnets 282 toward the first bearing chamber 410. Due to the air curtain, the first bearing 400 is cooled.

The remainder of the first branched air flow AR1 passes through the relay holes 446 of the spacer ring 440 and the flow-through holes 438 of the ring holder member 426 of the first bearing holder 420, and flows into the first drain passage 736. As noted previously, the first drain passage 736 includes the first guidance passage 742, the internal space 464 of the first sub-housing 26, the second guidance passage 744, and the merging flow path 746. The first branched air flow AR1 that has passed through the flow-through holes 438 initially flows into the first guidance passage 742 that is formed in the first sub-housing 26. Since the first guidance passage 742 communicates with the second guidance passage 744 via the internal space 464, and the second guidance passage 744 communicates with the merging flow path 746, the first branched air flow AR1 flows sequentially through the internal space 464, the second guidance passage 744, and the merging flow path 746. Thereafter, the first branched air flow AR1 flows from the merging flow path 746 into the second drain passage 740.

The second branched air flow AR2 flows inside the rotor chamber 34 which forms one portion of the second branching passage 738. Inside the rotor chamber 34, the second branched air flow AR2 primarily flows between the outer circumferential surface of the permanent magnets 282 and the inner circumferential surface of the partition wall member 32. More specifically, the second branched air flow AR2 comes into contact with the permanent magnets 282. Due to such contact, the rotor 62 is cooled. The second branched air flow AR2 that has cooled the rotor 62 passes through the coolant outlet 708 of the rotor chamber 34, and is divided into the main air flow Ms that flows through the second branching passage 738, and the branched air flow Sb that flows through the air distribution pathway 702.

The main air flow Ms reaches the second distal end 522 of the second bearing chamber 520. On the other hand, the branched air flow Sb passes between the inner surface forming the inner chamber 512 of the second sub-housing 28 and the outer surface of the flow rectifying member 550, and reaches the second proximal end 524 of the second bearing chamber 520. Moreover, the remainder of the branched air flow Sb is discharged externally of the rotating electric machine housing 22 via the ventilation hole 554 that is formed between the second sub-housing 28 and the outer shaft 70. In this manner, by the remainder of the compressed air AR being discharged externally of the rotating electric machine housing 22, the pressure of the compressed air AR that flows through the interior of the rotating electric machine housing 22 is adjusted to be substantially constant.

As can be understood from the foregoing, an air curtain that surrounds the second bearing 500 is formed in the second bearing chamber 520. Due to the air curtain, the second bearing 500 is cooled.

The second branched air flow AR2 that is supplied excessively to the second bearing chamber 520 is guided by the inner surface 551 of the flow rectifying member 550, and is led toward the second drain passage 740. In the second drain passage 740, the first branched air flow AR1 and the second branched air flow AR2 merge together. In this instance, the lubricating oil LO is supplied respectively to the first bearing 400 and the second bearing 500. Therefore, the first branched air flow AR1 that has passed through the first bearing chamber 410 and the second branched air flow AR2 that has passed through the second bearing chamber 520 are substantially a gas-liquid mixture. The first branched air flow AR1 and the second branched air flow AR2 that have passed through the merging flow path 746 are led from the rotating electric machine housing 22 toward the gas-liquid separation device 900.

The compressed air AR and the cooling oil CO or the lubricating oil LO are separated in the gas-liquid separation device 900. The compressed air AR from which the cooling oil CO has been separated is discharged from the gas-liquid separation device 900 into the atmosphere.

In the foregoing manner, simultaneously with the compressed air AR flowing through the rotating electric machine housing 22, the cooling oil CO and the lubricating oil LO also flow inside the rotating electric machine housing 22. A description will be given concerning the flow through pathways of the cooling oil CO and the lubricating oil LO.

In the first oil coolant flow path 800, the cooling oil Co is supplied from the tank 906 to the first oil supply passage

802. Since the first oil supply passage 802 communicates with the stator chamber 36, the cooling oil CO moves toward the stator chamber side drain passage 804 while filling the stator chamber 36. In this manner, the stator 64 in the stator chamber 36 becomes placed in a state of being immersed in the cooling oil CO. In accordance with this feature, the stator 64 is cooled.

In a process in which the cooling oil CO inside the stator chamber 36 is led toward the stator chamber side drain passage 804, the cooling oil CO passes through the coolant passage 324 that is provided in the neutral point fixing structure 304. By the cooling oil CO passing through the coolant passage 324, the neutral point 318 and the neutral point terminal 320 are cooled. Further, the conduction of heat from the coil end portion 314 to the neutral point terminal 320 can be reduced.

The cooling oil CO inside the stator chamber 36 flows toward the first casing 40 along the first wall surface 612 of the partition member 610. At this time, the direction in which the cooling oil CO moves is a second direction from the interior in the diametrical direction toward the exterior in the diametrical direction of the rotating electric machine housing 22. In this manner, the flow direction of the cooling oil CO that flows along the first wall surface 612 of the partition member 610, and the flow direction of the compressed air AR that flows along the second wall surface 614 of the partition member 610 are mutually opposite directions.

The cooling oil CO that has flowed through the stator chamber 36 flows from the first end of the stator chamber 36 into the contact chamber 44 of the first casing 40. The cooling oil co inside the contact chamber 44 comes into contact with the terminal portions 295, the terminal wires 298, and the screws 296. Consequently, the electrical contact between the U-phase terminal 151a and the U-phase coil is cooled. For the same reason, the electrical contact between the V-phase terminal 151b and the V-phase coil is also cooled. The electrical contact between the W-phase terminal 151c and the W-phase coil is also cooled.

The cooling oil CO inside the contact chamber 44 flows into the stator chamber side drain passage 804. The cooling oil CO that has flowed through the stator chamber side drain passage 804 is recovered in the tank 906. Thereafter, the cooling oil Co is resupplied from the tank 906 to the first oil supply passage 802 via the first return pipe 910. Moreover, the cooling oil CO that flows through the stator chamber side drain passage 804 may be delivered to the gas-liquid separation device 900, and thereafter, delivered from the gas-liquid separation device 900 to the tank 906.

In the second oil coolant flow path 840, the lubricating oil LO is supplied from the tank 906 to the second oil supply passage 842. One portion of the lubricating oil LO is supplied to the first outer ring 406 of the first bearing 400 via the second oil supply passage 842, the communication holes 846 of the holder spacer 844, and the first oil supply holes 436 of the spacer ring 440. Another portion of the lubricating oil LO flows from the second oil supply passage 842 into the oil distribution passage 849 that is formed in the first nozzle member 848, and furthermore, is discharged from a discharge portion provided in the first nozzle member 848 into the first distal end 412 of the first bearing chamber 410. Accordingly, the direction in which the lubricating oil LO is supplied to the first bearing chamber 410 is a first direction from the first bearing chamber 410 toward the permanent magnets 282. In the foregoing manner, the lubricating oil LO supplied to the first bearing 400 cools and lubricates the first bearing 400. Thereafter, the lubricating oil LO is recovered in the gas-liquid separation device 900 via the internal space 464 of the first sub-housing 26, and the first drain passage 736.

Another portion of the lubricating oil LO flows into the third oil supply passage 852 from the second oil supply passage 842, and is supplied to the second outer ring 506 of the second bearing 500 via the second oil supply hole 536 that is formed in the second bearing holder 530. The lubricating oil LO is also supplied to the second bearing 500 from a discharge portion 556 provided in the main housing 24. Such a lubricating oil LO cools and lubricates the second bearing 500. Thereafter, the lubricating oil LO is recovered in the gas-liquid separation device 900 via the second drain passage 740 that communicates with the second bearing chamber 520.

As noted previously, the first branched air flow AR1 supplied to the first proximal end 414 of the first bearing chamber 410 forms an air curtain. It is difficult for the lubricating oil LO that is supplied to the first bearing 400 to pass through the air curtain and enter into the rotor chamber 34. In the second bearing chamber 520, the main air flow Ms that is supplied to the second distal end 522, and the branched air flow Sb that is supplied to the second proximal end 524 form an air curtain. It is difficult for the lubricating oil LO that is supplied to the second bearing 500 to pass through the air curtain and enter into the rotor chamber 34. Therefore, the lubricating oil LO is prevented from entering into the rotor chamber 34. Consequently, it is possible to avoid a situation in which the permanent magnets 282 become contaminated by the lubricating oil LO.

Further, it is difficult for the lubricating oil LO to enter from the second bearing chamber 520 into the inner chamber 512 of the second sub-housing 28. Accordingly, it is also possible to avoid a situation in which the flow regulating member 550 becomes contaminated by the lubricating oil LO.

The lubricating oil LO contains the compressed air AR by which the air curtain is formed. The gas-liquid separation device 900 separates the compressed air AR from the lubricating oil LO. The lubricating oil LO from which the compressed air AR has been separated is temporarily stored in the tank 906, and thereafter, is resupplied to the second oil supply passage 842 from the second return pipe 912.

In the third oil coolant flow path 870, the cooling oil CO is supplied from the tank 906 to the fourth oil supply passage 872, and flows through the oil guidance passage 876 that is formed in the second nozzle member 874. The cooling oil co is discharged from the discharge portion 878 provided in the second nozzle member 874 and toward the first shaft portion 70a of the outer shaft 70. The cooling oil CO flows through the rotor internal flow path 250 along the axial direction of the rotating shaft 66. Specifically, the cooling oil CO passes through a flow through space between the screw cap 220 and the first shaft portion 70a, the groove shaped flow paths 230 that are covered by the first inner ring 402 of the first bearing 400, the guide flow paths 232, a flow through space between the outer shaft 70 and the inner ring stopper 460, a flow through space between the outer shaft 70 and the first magnet stopper 286, a flow through space between the outer shaft 70 and the magnet holder 280, and a flow through space between the outer shaft 70 and the second magnet stopper 288. As a result, the cooling oil CO reaches the second distal end 522 of the second bearing chamber 520.

The cooling oil CO that has flowed through the rotor internal flow path 250 merges with the lubricating oil LO at the second drain passage 740. Thereafter, in the same manner as the lubricating oil LO, the cooling oil CO is recovered in the gas-liquid separation device 900 via the second drain passage 740. The cooling oil CO from which the compressed air AR has been separated in the gas-liquid separation device 900 is temporarily stored in the tank 906, and thereafter, is returned to the fourth oil supply passage 872 via the third return pipe 914.

In the foregoing manner, according to the present embodiment, the same oil is used both as the lubricating oil LO (a lubricant) and the cooling oil CO (a liquid coolant). Therefore, it is possible to combine the lubricant circulation supply flow path, and the liquid coolant circulation supply flow path. Therefore, it is possible to simplify the configuration of the lubricant circulation supply flow path and the liquid coolant circulation supply flow path. However, the lubricant and the liquid coolant may be different liquids.

Accompanying the continued operation of the rotating electric machine 60, the rotating electric machine 60 becomes heated. At this time, at least one of the first end part or the second end part of the partition wall member 32 is capable of extending freely along the axial direction of the partition wall member 32 based on thermal expansion. This is because at least one of both end surfaces of the partition wall member 32 is a non-contact surface that does not abut against other members, and therefore, is an unconstrained surface that is not constrained by the other members.

In addition, in this case, the partition wall member 32 is floatingly supported via the first sealing member 624, the third sealing member 618, and the second sealing member 634. Accordingly, based on thermal expansion, the partition wall member 32 can also be freely expanded along the diametrical direction of the partition wall member 32.

For the above reasons, the expanded partition wall member 32 is prevented from receiving an excessive compressive stress from the other members. Stated otherwise, concentration of excessive compressive stress on the partition wall member 32 is avoided.

Figure 12:
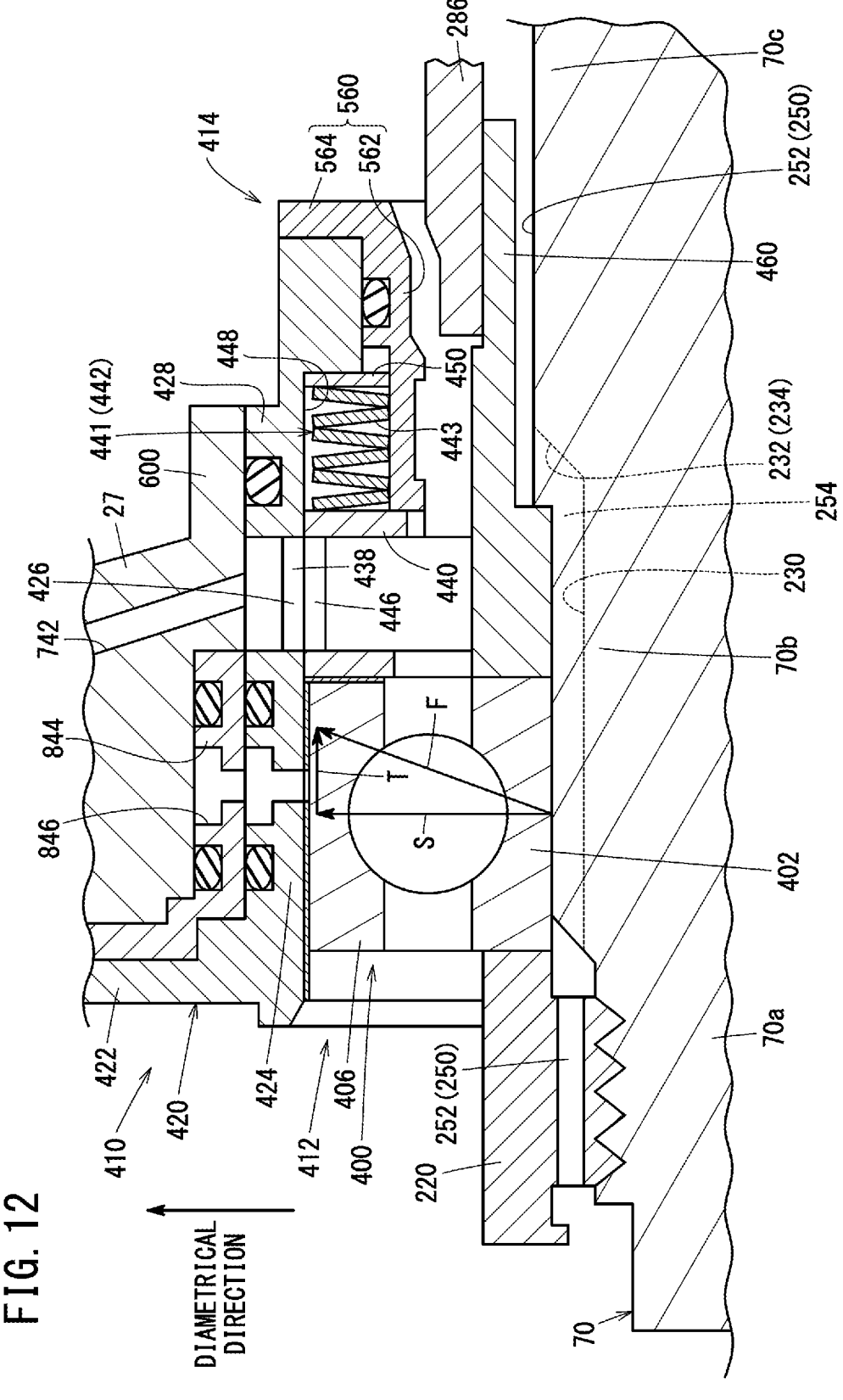
FIG. 12 is an enlarged cross-sectional view of main parts in which a resultant force that acts on the first bearing is shown.

At a time when vibrations or the like occur in the rotating shaft 66, as shown in FIG. 12, a load is input from the rotating shaft 66 to the first bearing 400 from the interior in the diametrical direction toward the exterior in the diametrical direction. Hereinafter, such a load will be referred to as an "input load S". Due to the input load S, a load acts on the disc springs 443 at a force point where the disc springs 443 (the elastic body 442 serving as the pressure applying member 441) applies pressure to the first bearing 400. Hereinafter, such a load will be referred to as an "acting load T".

In the present embodiment, the entirety of the disc springs 443 is accommodated inside the first bearing holder 420. Therefore, an angle of intersection between a resultant force F formed by the input load S and the applied load T, and the diametrical direction of the rotating shaft 66 is small. In this manner, in the resultant force F that acts on the first bearing 400, the amount of deviation from the diametrical direction of the rotating shaft 66 is small. Moreover, in a typical example, the angle of intersection lies within 5 degrees, and the resultant force F is directed from the center of the rotating shaft 66 toward the point of force.

Therefore, a rotational moment acting on the first bearing 400 due to the resultant force F can be reduced. As a result, since vibrations of the first bearing 400 are suppressed, the durability of the first bearing 400 can be enhanced. In addition, since the pressure applying member 441 that is small in scale can be used, the rotating electric machine system 20 can be kept small in scale.

It is assumed that maintenance will be performed on the rotating electric machine 60. In this case, when the inner shaft 68 is removed from the outer shaft 70, the operator disengages the first engaging member 164 and the second engaging member 166, and thereby is capable of removing the locking sleeve 160 from the first hollow end part 72. Thereafter, by rotating the nut member 130 in a direction to loosen the same, the operator is capable of removing the nut member 130 from the extending portion 90.

After the maintenance is completed, in contrast to the above, the operator inserts the inner shaft 68 into the outer shaft 70, and thereafter, rotates the nut member 130 in a direction to tighten the same, and thereby is capable of attaching the nut member 130 to the extending portion 90. Thereafter, by placing the first engaging member 164 and the second engaging member 166 in engagement with each other, the locking sleeve 160 can be attached to the first hollow end part 72. In the foregoing manner, according to the configuration described above, the rotating shaft 66 can be easily disassembled and assembled.

By the positioning and fixing member 120, the inner shaft 68 is prevented from coming off from the outer shaft 70. Accordingly, it is not necessary to carry out crimping with respect to the outer shaft 70, for example, in order to prevent the inner shaft 68 from coming off from the outer shaft 70. Accordingly, when maintenance is performed on the rotating shaft 66, the inner shaft 68 can be easily removed from the outer shaft 70.

Further, there is no need to secure the threaded connection with an adhesive in order to prevent loosening of the threaded connection between the nut member 130 and the extending portion 90. Accordingly, when performing maintenance on the rotating shaft 66, there is no need to remove an adhesive adhered to the threaded connection.

The advantageous effects of the present embodiment, including those described above, can be summarized in the following manner.

The rotating electric machine system 20 is equipped with the rotating electric machine 60 having the rotor 62 and the stator 64, and the rotating electric machine housing 22 in which the rotating electric machine 60 is accommodated. The rotating electric machine housing 22 includes the stator chamber 36 in which the stator 64 is accommodated, and further, through which the liquid coolant that cools the stator 64 flows. The rotor 62 includes the rotating shaft 66. The rotating shaft 66 extends along the axial direction. In this instance, the axial direction is a direction that is perpendicular with respect to the diametrical direction of the rotating shaft 66. The stator 64 includes: the stator core 300; the coil unit 302 that is made up from the plurality of electromagnetic coils 310 formed by the plurality of conductive wires 312 that are wound around the stator core 300, and further, the coil end portion 314 that is the end part of the plurality of electromagnetic coils 310; and the neutral point terminal 320 provided at the neutral point 318 formed by the terminal ends 316 of the plurality of conductive wires 312 that are drawn out from the coil unit 302. The rotating electric machine system 20 is further equipped with the partition member 610 that is accommodated inside the housing and is a separate body from the housing. The partition member 610 includes the first wall surface 612 that forms one portion of an inner surface of the stator chamber 36, and further, faces toward an end part of the coil end portion 314 in the axial direction, and the concave portion 627 that is formed in the first wall surface 612 and is recessed in a direction to separate away from the coil end portion 314, and the bottom surface of which is formed by one portion of the first wall surface 612. Between the neutral point terminal 320 and the bottom surface 628 of the concave portion 627, the liquid coolant flow path is formed through which the liquid coolant (the cooling oil CO or the like) flows.

By the liquid coolant flowing into the concave portion 627, the neutral point terminal 320 is cooled. In accordance with this feature, the neutral point terminal 320 and the coil end portion 314 are cooled, and therefore, a decrease in efficiency due to the generation of heat by the electromagnetic coils 310 can be suppressed. Further, deterioration of the electromagnetic coils 310 can also be suppressed.

The bottom surface 628 of the concave portion 627 has a shape corresponding to the shape of the neutral point terminal 320.

Consequently, the flow resistance between the neutral point terminal 320 and the bottom surface 628 of the concave portion 627 becomes small. Accordingly, the liquid coolant easily flows between the neutral point terminal 320 and the bottom surface 628 of the concave portion 627. As a result, the neutral point terminal 320 is efficiently cooled.

The neutral point terminal 320 includes the first curved surface 319a, and the bottom surface 628 of the concave portion 627 includes the second curved surface 319b that is curved corresponding to the shape of the first curved surface 319a of the neutral point terminal 320.

Even in the case that the neutral point terminal 320 includes the first curved surface 319a, the liquid coolant is capable of easily flowing between the neutral point terminal 320 and the bottom surface 628 of the concave portion 627. More specifically, in this case as well, the neutral point terminal 320 is efficiently cooled.

The housing includes the gaseous coolant flow path 700 through which the gaseous coolant (the compressed air AR or the like) that serves to cool the rotating electric machine 60 flows. The partition member 610 includes the second wall surface 614 that is a rear surface of the first wall surface 612. The second wall surface 614 forms one portion of the inner surface of the gaseous coolant flow path 700.

In accordance with such a configuration, while cooling the stator 64 with the liquid coolant, it is possible to cool a predetermined location in the rotating electric machine 60 other than the stator chamber 36 with the gaseous coolant. Consequently, the heat generated in the rotating electric machine 60 can be removed more quickly from the electromagnetic coils 310.

In such a configuration, the partition member 610 prevents the liquid coolant that is supplied to the stator 64, and the gaseous coolant that is supplied to the predetermined location from mixing with each other. Accordingly, for example, a situation is avoided in which the member arranged at the predetermined location (such as the permanent magnets 282 of the rotor 62 or the like) becomes wet due to the liquid medium (such as the cooling oil CO or the like).

The gaseous coolant flow path 700 communicates with the rotor chamber 34, and the partition member 610 separates the gaseous coolant flow path 700 and the stator chamber 36 from each other in a liquid-tight and air-tight manner.

When the liquid coolant is supplied to the rotor chamber 34, the rotational speed of the rotor 62 decreases due to the viscosity of the liquid coolant. In accordance with the above-described configuration, the occurrence of such a problem can be avoided. In the foregoing manner, since the partition member 610 prevents the liquid coolant and the gaseous coolant from mixing with each other, a situation can be avoided in which the liquid coolant that is supplied to the stator chamber 36 is supplied to the rotor chamber 34. In addition, the rotor 62 inside the rotor chamber 34 is capable of being cooled by the gaseous coolant.

The rotating electric machine system 20 is equipped with the cylindrical shaped partition wall member 32 that surrounds the rotor 62 and forms the rotor chamber 34 in the interior thereof. The stator chamber 36 is formed diametrically outward of the partition wall member 32. In this instance, the partition wall member 32 includes the first end that is one end part in the axial direction, and the second end that is another end part in the axial direction. The partition member 610 includes a tubular portion in which an insertion hole is formed. The first end of the partition wall member 32 is inserted into the insertion hole. The outer circumferential surface of the first end of the partition wall member 32 and the inner circumferential surface of the insertion hole are sealed by a sealing member.

By the partition member 610 and the partition wall member 32 being combined, the stator chamber 36 and the gaseous coolant flow path 700 can be reliably separated from each other.

The gaseous coolant flow path 700 includes the downstream side end part 704 that is maximally downstream in the flow direction of the gaseous coolant. The coolant inlet 706, which is an inlet for the gaseous coolant to enter into the rotor chamber 34, is formed in the partition wall member 32 at the first end that is inserted into the insertion hole. In addition, the coolant outlet 708, which is an outlet for the gaseous coolant to be discharged from the rotor chamber 34, is formed at the second end of the partition wall member 32. The downstream side end part 704 of the gaseous coolant flow path 700 faces toward the coolant inlet 706.

In accordance with such a configuration, the gaseous coolant that has flowed through the gaseous coolant flow path 700 reliably flows into the rotor chamber 34.

The rotating electric machine system 20 is equipped with the first sealing member 624 interposed between the first end of the partition wall member 32 and the partition member 610, the second sealing member 634 interposed between the second end of the partition wall member 32 and the housing, and the liquid coolant supplying device that supplies the liquid coolant to the stator chamber 36. In such a configuration, at least one of the first end surface or the second end surface of the partition wall member 32 is a non-contact surface that does not come into contact with any member.

At least one of the distal end surface 32a at the first end part or the distal end surface 32b at the second end part in the partition wall member 32 is an unconstrained surface that is not constrained by any other member. Accordingly, at a time when the rotating electric machine 60 becomes heated accompanying continuous operation of the rotating electric machine 60, at least one of the first end part or the second end part of the partition wall member 32 is capable of freely extending along the axial direction of the partition wall member 32 based on thermal expansion. Therefore, both end parts of the partition wall member 32 that are extended along the axial direction are prevented from receiving a compressive stress from other members.

Further, the partition wall member 32 is floatingly supported by the partition member 610 via the first sealing member, and further, is floatingly supported by the housing via the second sealing member. Accordingly, based on thermal expansion, the partition wall member 32 can also be freely expanded along the diametrical direction of the partition wall member 32. Therefore, the outer circumferential surface of the partition wall member 32, which is expanded along the diametrical direction, is also prevented from receiving a compressive stress from other members.

The partition wall member 32 is made from a ceramic.

Such a ceramic is a material that exhibits high strength, an insulating property, and resistance to heat. Therefore, even in the case that the partition wall member 32 is formed to be thin-walled, the strength and the insulating property of the partition wall member 32 are ensured, and stability with respect to heat is exhibited. Consequently, the partition wall member 32 exhibits sufficient durability. Further, the partition wall member 32 which is made from a ceramic hardly interrupts the alternating magnetic field between the rotor 62 and the stator 64.

The partition member 610 includes the left insertion hole 622 into which the first end of the partition wall member 32 is inserted. The first sealing member forms a seal between the outer circumferential surface of the first end of the partition wall member 32, and the inner circumferential surface of the insertion hole.

In accordance with such a configuration, it is easy for the partition wall member 32 to be floatingly supported by the partition member 610 via the first sealing member. Further, since the outer circumferential surface of the first end of the partition wall member 32 and the inner circumferential surface of the left insertion hole 622 are sealed, leakage of the gaseous coolant into the stator chamber 36 is avoided. Conversely, leakage of the liquid coolant into the gaseous coolant flow path 700 is also avoided.

The housing includes the gaseous coolant discharge passage (the air distribution pathway 702) that communicates with the rotor chamber 34 and through which the gaseous coolant flows. The second end of the partition wall member 32 is inserted into an opening of the gaseous coolant discharge passage. The second sealing member forms a seal between the outer circumferential surface of the second end, and the inner circumferential surface of the gaseous coolant discharge passage.

In accordance with such a configuration, it is easy for the partition wall member 32 to be floatingly supported by the rotating electric machine housing 22 via the second sealing member. Further, since the inner circumferential surface of the gaseous coolant discharge passage and the outer circumferential surface of the second end are sealed, leakage of the gaseous coolant into the stator chamber 36 is avoided. Conversely, leakage of the liquid coolant into the gaseous coolant flow discharge passage is also avoided.

The rotating electric machine housing 22 includes the bearing retaining member 27. The rotating electric machine system 20 is equipped with the first bearing chamber 410 formed between the bearing retaining member 27 and the rotating shaft 66, and the first bearing 400 that is accommodated in the first bearing chamber 410. The rotor chamber 34 communicates with the first bearing chamber 410.

In accordance with this feature, for example, the gaseous coolant for the purpose of cooling the rotor 62 can be supplied to the first bearing chamber 410. Alternatively, the gaseous coolant for the purpose of cooling the first bearing 400 can be supplied to the rotor chamber 34. Therefore, it is possible to cool the rotor 62 and the first bearing 400 using the same gaseous coolant.

An end part (the tubular shaped portion 600) of the bearing retaining member 27 that faces toward the partition wall member 32 is inserted into the partition wall member 32.

In this case, in comparison with a case in which the end part of the bearing retaining member 27 is not accommodated in the interior of the partition wall member 32 (the rotor chamber 34), the length in the axial direction of the rotating electric machine housing 22 can be made shorter.

The partition member 610 has a side wall (the annular shaped edge part 616) that extends along the axial direction. The rotating electric machine system 20 is equipped with the third sealing member 618 interposed between the side wall and the rotating electric machine housing 22.

In accordance with such a configuration, the first end of the partition wall member 32 is indirectly supported in a floating manner in the rotating electric machine housing 22 via the third sealing member 618. At a time when the partition wall member 32 expands along the diametrical direction of the partition wall member 32 based on thermal expansion, the first sealing member 624 and the third sealing member 618 are compressed. Due to being compressed in this manner, the expansion of the partition wall member 32 in the diametrical direction is absorbed. Therefore, the outer circumferential surface of the partition wall member 32, which is expanded along the diametrical direction, is further prevented from receiving a compressive stress from other members.

The rotating electric machine system 20 is equipped with the first bearing 400 that is interposed between the rotating electric machine housing 22 and the rotating shaft 66, and includes the first inner ring 402 and the first outer ring 406. The rotating electric machine system 20 is further equipped with the hollow tubular shaped first bearing holder 420 that retains the first bearing 400, and the pressure applying member 441 that is provided between the first bearing holder 420 and the first bearing 400, and applies a pressure to the first bearing holder 420 along the axial direction of the rotating shaft 66.

As shown in FIG. 12, the resultant force F is formed by the diametrically directed input load S that is input to the first bearing 400 from the rotating shaft 66, and the axially directed acting load T that acts on the pressure applying member 441 due to the input load S. In the aforementioned configuration, since the pressure applying member 441 is accommodated inside the first bearing holder 420, the acting load T is considerably smaller than the input load S. Accordingly, in the above-described configuration, the angle of intersection between the resultant force F formed by the input load S and the applied load T, and the diametrical direction of the rotating shaft 66 is considerably small. Therefore, a rotational moment acting on the first bearing 400 due to the resultant force F can be reduced. As a result, since vibrations of the first bearing 400 are suppressed, the durability of the first bearing 400 can be enhanced.

In the first outer ring 406, the pressure applying member 441 applies the load along the axial direction of the rotating shaft 66, with respect to the second end surface facing in the axial direction of the rotating shaft 66.

In this case, the angle of intersection between the resultant force F and the diametrical direction of the rotating shaft 66 can be further reduced. Consequently, vibrations of the first bearing 400 are further suppressed. Accordingly, the durability of the first bearing 400 can be further enhanced.

The outer diameter of the first bearing 400 and the outer diameter of the pressure applying member 441 are approximately equal.

According to the present configuration, it is possible to further reduce the angle of intersection between the resultant force F and the diametrical direction of the rotating shaft 66. Consequently, the vibrations of the bearings can be further suppressed, and the durability of the bearings can be further enhanced.

The pressure applying member 441 is constituted by the elastic body 442.

By having the pressure applying member 441 be the elastic body 442, the pressure can be applied substantially uniformly over the entire circumference of the first bearing 400.

The rotating electric machine system 20 includes the guide member 560 having the tubular shaped guide portion 562 disposed in the interior of the first bearing holder 420, and the accommodation chamber 448 that is formed between the inner circumferential surface of the first bearing holder 420 and the outer circumferential surface of the tubular shaped guide portion 562. The elastic body 442 which is the pressure applying member 441 is accommodated in the accommodation chamber 448.

In accordance with such a configuration, when the elastic body 442 expands and contracts inside the accommodation chamber 448, the elastic body 442 can be guided by the tubular shaped guide portion 562.

The rotating electric machine system 20 is equipped with the oil supplying device 904 that supplies the lubricating oil LO to the first bearing 400 and the second bearing 500. The rotating electric machine housing 22 includes the second oil supply passage 842 in order to supply the lubricating oil LO to the first bearing 400 and the second bearing 500. The first bearing holder 420 includes the first oil supply holes 436 at a position facing toward the outer circumferential surface of the first bearing 400, and by which the inner circumferential surface and the outer circumferential surface of the first bearing holder 420 communicate with each other. The second bearing holder 530 includes the second oil supply hole 536 at a position facing toward the outer circumferential surface of the second bearing 500, and by which the inner circumferential surface and the outer circumferential surface of the second bearing holder 530 communicate with each other.

In accordance with such a configuration, the lubricating oil LO from the oil supplying device 904 is capable of being supplied respectively to the first bearing 400 and the second bearing 500, via the first oil supply holes 436 of the first bearing holder 420 and the second oil supply hole 536 of the second bearing holder 530. Alternatively, it is possible for the lubricating oil LO that has flowed through the flow-through holes 438 of the bearing holder to be supplied to the bearings. In this manner, by the first oil supply holes 436 and the second oil supply hole 536 being formed respectively in the first bearing holder 420 and the second bearing holder 530, the lubricating oil LO can easily be supplied with respect to the first bearing 400 and the second bearing 500.

The rotating electric machine system 20 is equipped with the spacer ring 440 serving as an intermediate member, and which is accommodated in the interior of the first bearing holder 420 and is interposed between the disc springs 443 and the first bearing 400 in the axial direction. The disc springs 443 apply a pressure to the bearing via the spacer ring 440. In this instance, the spacer ring 440 includes the relay holes 446 through which the lubricating oil LO is capable of flowing.

Even in the case that the rotating electric machine system 20 is the spacer ring 440 (the intermediate member), the lubricating oil LO that is supplied to the first bearing 400 can be discharged to the exterior of the first bearing holder 420 via the relay holes 446 of the spacer ring 440, and the flow-through holes 438 that are formed in the first bearing holder 420. Alternatively, the lubricating oil LO that has flowed through the flow-through holes 438 of the first bearing holder 420, and thereafter, that has flowed through the relay holes 446 of the spacer ring 440 can be supplied to the first bearing 400. In this manner, by forming the relay holes 446 in the spacer ring 440, and further, forming the flow-through holes 438 in the first bearing holder 420, the lubricating oil LO can be easily supplied to and discharged from the first bearing 400.

Further, since the spacer ring 440 is interposed between the disc springs 443 and the first bearing 400, a situation can be avoided in which the disc springs 443 directly contact the first bearing 400. Therefore, when the disc springs 443 apply a pressure to the first bearing 400, any concern that damage may be incurred by the first bearing 400 can be dispensed with.

The rotating electric machine system 20 is equipped with the first bearing 400 that is interposed between the rotating electric machine housing 22 and the rotating shaft 66, the oil supplying device 904 that supplies the lubricating oil LO to the first bearing 400, and the hollow tubular shaped first bearing holder 420 provided in the rotating electric machine housing 22 and that retains the first bearing 400. The first bearing holder 420 includes the first cover member 424 that covers the first bearing 400 from the outer side in the diametrical direction of the rotating shaft 66. The rotating electric machine system 20 is further equipped with an insulating element (the first insulating element 430 and the second insulating element 432) interposed between the outer circumferential surface of the first bearing 400 and the inner circumferential surface of the first cover member 424. Further, a circumferential wall portion of the first bearing holder 420 includes the flow-through holes 438 through which the lubricating oil LO flows.

An oil film is formed by the lubricating oil LO between the outer circumferential surface of the first bearing 400 and the inner circumferential surface of the first cover member 424 of the first bearing holder 420. In this instance, the first insulating element 430 and the second insulating element 432 are interposed between the outer circumferential surface of the first bearing 400 and the inner circumferential surface of the first cover member 424 of the first bearing holder 420. Due to the first insulating element 430 and the second insulating element 432, the occurrence of an electric discharge between the first bearing 400 and the first bearing holder 420 (in particular, between the first bearing 400 and the first cover member 424) is suppressed. Accordingly, the first bearing 400 (the first inner ring 402, the first rolling balls 404, and the first outer ring 406) is prevented from being damaged. Furthermore, since the oil film exists in a stable manner, deterioration of the lubricating oil LO accompanying the electric discharge is also suppressed. For the reasons described above, vibrations of the first bearing 400 are suppressed.

Furthermore, even under a situation in which heat dissipation is deteriorated due to the presence of the insulating element in the aforementioned position, since the first bearing 400 is cooled by the lubricating oil LO that flows through the flow-through holes 438, it is possible to improve the durability of the first bearing 400.

The first insulating element 430 and the second insulating element 432, for example, are insulating films that are formed on the inner circumferential surface of the first cover member 424.

The thickness of the insulating film can be made smaller than the thickness of the annular shaped insulating object. Accordingly, it is easy for the first insulating element 430 and the second insulating element 432 (the insulating films) to be interposed between the outer circumferential surface of the first bearing 400 and the first cover member 424.

The first insulating element 430 and the second insulating element 432 may be insulating films that are formed on the outer circumferential surface of the first bearing 400. In this case as well, the same advantageous effects as in the case that the insulating films are formed on the inner circumferential surface of the first cover member 424 can be obtained.

The material of the first bearing 400 is a metallic material, and the material of the first bearing holder 420 is also a metallic material.

The first bearing 400 and the first bearing holder 420 which are made of a metal material exhibit higher durability than a bearing holder and a bearing made of a material other than a metal material.

The first cover member 424 includes the first oil supply holes 436 at a position facing toward the outer circumferential surface of the first bearing 400, and first oil supply holes 436 place the inner circumferential surface and the outer circumferential surface of the first cover member 424 in communication with each other.

In accordance with such a configuration, the lubricating oil LO can be easily supplied to the outer circumferential surface of the first bearing 400 via the first oil supply holes 436 that are formed in the first bearing holder 420.

The rotating electric machine system 20 is equipped with the gaseous coolant supplying device that supplies the gaseous coolant to the rotating electric machine housing 22. Moreover, although a typical example of the gaseous coolant supplying device is the gas turbine engine 950, the gaseous coolant supplying device may also be a compressor or the like. The rotating electric machine housing 22 includes the gaseous coolant flow path 700 through which the gaseous coolant flows. The flow-through holes 438 formed in the first bearing holder 420 communicate with the gaseous coolant flow path 700.

Due to this feature, the gaseous coolant can be supplied to the first bearing 400. Accordingly, it is possible to further cool the first bearing 400.

The rotating electric machine housing 22 includes the first bearing chamber 410 in which the first bearing holder 420 is arranged. When the direction from the first bearing chamber 410 toward the permanent magnets 282 along the axial direction of the rotating shaft 66 is defined as a first direction, and the direction opposite to the first direction is defined as a second direction, the lubricating oil LO is supplied to the first bearing holder 420 along the first direction. On the other hand, the gaseous coolant is supplied to the first bearing holder 420 along the second direction.

The gaseous coolant becomes an air curtain that blocks the lubricating oil LO. Due to this feature, penetration of the lubricating oil LO into the rotating electric machine housing 22 can be suppressed.

The rotating electric machine system 20 is equipped with the first bearing 400 and the second bearing 500, the liquid coolant supplying device that supplies the liquid coolant to the rotor 62, and the rotor internal flow path 250 that is formed in the interior of the rotor 62, extends along the axial direction of the rotating shaft 66, and through which the liquid coolant flows. The rotating shaft 66 includes the second shaft portion 70*b* having a small diameter, and the third shaft portion 70*c* having a larger diameter than the second shaft portion 70*b*. The third shaft portion 70*c* is adjacent to the second shaft portion 70*b* downstream in a flow direction of the liquid coolant that flows through the rotor internal flow path 250. The rotating shaft 66 includes the groove shaped flow paths 230 that are recessed from the outer surface of the second shaft portion 70*b* inwardly in the diametrical direction of the second shaft portion 70*b*, and further, which extend along the axial direction of the rotating shaft 66. The first bearing 400 is provided diametrically outward of the second shaft portion 70*b*. The inner circumferential surface of the first bearing 400 covers the groove shaped flow paths 230, and thereby constitutes one portion of the rotor internal flow path 250.

The liquid coolant comes into contact with the inner circumferential surface of the first bearing 400 when flowing through the groove shaped flow paths 230. Due to such contact, the first bearing 400 is efficiently cooled.

The rotor internal flow path 250 is formed at an end part of the third shaft portion 70*c* that faces toward the second shaft portion 70*b*, and includes the guide flow paths 232 that are continuous with the groove shaped flow paths 230. As the bottom surfaces 234 of the guide flow paths 232 separate away from the second shaft portion 70*b*, the bottom surfaces are inclined surfaces that are inclined in a manner so as to be inclined from the inner side in the diametrical direction of the rotating shaft 66 toward the outer surface of the third shaft portion 70*c*.

At a time when the rotating shaft 66 is rotating, the liquid coolant flows through the rotor internal flow path 250. Accordingly, a centrifugal force acts on the liquid coolant that flows through the rotor internal flow path 250 along the axial direction of the rotating shaft 66. As it flows through the rotor internal flow path 250, the liquid coolant which is subjected to such a centrifugal force tends to move diametrically outward of the rotating shaft 66. In accordance with such a configuration, the liquid coolant flowing through the groove shaped flow paths 230 is capable of smoothly moving diametrically outward of the rotating shaft 66 along the guide flow paths 232.

The rotor 62 includes the magnet holder 280 interposed between the rotating shaft 66 and the permanent magnets 282 in the diametrical direction of the rotating shaft 66. At least one portion of the rotor internal flow path 250 is formed between the outer surface of the rotating shaft 66 and the inner circumferential wall of the magnet holder 280.

Due to this feature, the one portion of the rotor internal flow path 250 can be easily formed.

The liquid coolant supplying device is the oil supplying device 904 that supplies the cooling oil CO as a liquid coolant. The rotating electric machine housing 22 includes the oil supply passage (the second oil coolant flow path 840 and the third oil supply passage 852) in order to supply the cooling oil CO as a lubricant to the first bearing 400 and the second bearing 500.

In accordance with such a configuration, one portion of the lubricating oil LO for the purpose of lubricating the first bearing 400 and the second bearing 500 can be used as the liquid coolant. Accordingly, one device can be used both as the oil supplying device 904 and the liquid coolant supplying device. Therefore, it is possible to reduce the cost of capital investment. In addition, the configuration of the rotating electric machine system 20 can be simplified.

The rotating electric machine system 20 is equipped with the first bearing holder 420 that is provided in the rotating electric machine housing 22 and that retains the first bearing 400. The first bearing holder 420 includes the first oil supply holes 436 at a position facing toward the outer circumferential surface of the first bearing 400, and which place the inner circumferential surface of the first bearing holder 420 and the outer circumferential surface of the first bearing holder 420 in communication with each other, and through which the cooling oil CO flows.

Due to the first oil supply holes 436, the lubricating oil LO can be supplied to the first bearing 400 via the first bearing holder 420.

The rotating electric machine housing 22 includes the oil discharge passage (the second drain passage 740) that discharges to the oil supplying device 904 the cooling oil CO that has passed through the rotor internal flow path 250 and the oil supply passage.

In this case, the lubricating oil LO supplied to the first bearing 400 and the second bearing 500, and the cooling oil Co that has cooled the rotor 62 are discharged from the rotating electric machine housing 22, while on the other hand, a new lubricating oil LO and a new cooling oil CO can be supplied respectively to the first bearing 400, the second bearing 500, and the rotor 62. Accordingly, it is possible to continuously lubricate and cool the first bearing 400 and the second bearing 500, and it is also possible to continuously cool the rotor 62.

The oil supplying device 904 resupplies the lubricating oil LO and the cooling oil CO that are discharged from the second drain passage 740 (the oil discharge passage) to the rotor internal flow path 250 and the oil supply passage.

In accordance with such a configuration, the lubricating oil LO and the cooling oil CO can be circulated and supplied to the rotating electric machine system 20. Accordingly, the cost is less expensive than continuously supplying a new lubricating oil LO and a new cooling oil Co.

The rotating electric machine system 20 is equipped with the gaseous coolant supplying device that supplies the gaseous coolant to the first bearing 400 and the second bearing 500. In the above-described embodiment, the gaseous coolant supplying device is the gas turbine engine 950. The rotating electric machine housing 22 includes the gaseous coolant flow path 700 through which the gaseous coolant flows, and the gaseous coolant discharge passage for the purpose of discharging the gaseous coolant to the exterior of the housing. The oil supplying device 904 recovers the gaseous coolant that has flowed through the gaseous coolant discharge passage, and the cooling oil CO and the lubricating oil LO that have flowed through the second drain passage 740 (the oil discharge passage), and further, resupplies the cooling oil CO and the lubricating oil LO to the oil supply passage.

Since the oil supplying device 904 recovers the gaseous coolant, the lubricating oil LO, and the cooling oil Co together, there is no need for the gaseous coolant, the lubricating oil LO, and the cooling oil CO to be recovered separately. Accordingly, there is no particular need to provide a gaseous coolant recovery device in the rotating electric machine system 20. Therefore, a situation is avoided in which the configuration of the rotating electric machine system 20 becomes complex.

The oil supplying device 904 includes the gas-liquid separation device 900 that separates the gaseous coolant and the oil.

Since the gas-liquid separation device 900 separates the gaseous coolant and the oil, even though the gaseous coolant and the oil are recovered together, only the oil is capable of being resupplied to the oil supply passage. More specifically, in accordance with such a configuration, it is easy to circulate and supply the lubricating oil LO to the first bearing 400 and the second bearing 500, and to supply the cooling oil CO to the stator chamber 36 and the rotor internal flow path 250.

The rotating shaft 66 includes the hollow tubular shaped outer shaft 70, and the inner shaft 68 that is removably inserted into the hollow interior portion 30 of the outer shaft 70. The outer shaft 70 includes the first hollow end part 72 that is one end part in the axial direction of the rotating shaft 66, and the second hollow end part 74 that is another end part in the axial direction. The inner shaft 68 includes the left end part 80 (first end part) which is one end part in the axial direction, and the right end part 82 (second end part) which is another end part in the axial direction. The left end part 80 (first end part) includes the extending portion 90 that is exposed from the first hollow end part 72 and extends along the axial direction and along a direction to separate away from the first hollow end part 72.

The rotating shaft 66 is equipped with the positioning and fixing member 120 that positions and fixes the extending portion 90 with respect to the first hollow end part 72. The positioning and fixing member 120 includes the nut member 130 that is screw-engaged with the outer circumferential surface of the extending portion 90, the locking sleeve 160 surrounding the nut member 130, and the locking ring 180 that engages with the nut member 130 and the extending portion 90.

The nut member 130 includes the contact surface that contacts the end surface of the first hollow end part 72 in the axial direction. The locking sleeve 160 includes the first engaging member 164, and the second engaging member 166. The first engaging member 164 engages with the first locking member 76 provided on the first hollow end part 72, and thereby restricts relative rotation between the locking sleeve 160 and the first hollow end part 72 about the axial line of the rotating shaft 66. The second engaging member 166 engages with the second locking member 136 provided on the nut member 130, and thereby restricts relative rotation between the locking sleeve 160 and the nut member 130 about the axial line. The locking ring 180 includes the third engaging member 184 and the fourth engaging member 186. The third engaging member 184 engages with the third locking member 142 provided on the nut member 130, and thereby restricts relative rotation between the nut member 130 and the locking ring 180 about the axial line. The fourth engaging member 186 engages with the fourth locking member 102 (the key groove 104) provided on the extending portion 90, and thereby restricts relative rotation between the locking ring 180 and the extending portion 90 about the axial line.

As noted previously, the first engaging member 164 to the fourth engaging member 186 engage respectively with the first locking member 76 to the fourth locking member 102, in a manner so that the inner shaft 68 and the outer shaft 70 are mutually connected together. More specifically, the connecting structure between the inner shaft 68 and the outer shaft 70 becomes simplified. In addition, in accordance therewith, the fastened state of the nut member 130 with respect to the inner shaft 68 is prevented from loosening. Accordingly, there is no need to carry out crimping or the like in order to prevent the nut member 130 from loosening with respect to the inner shaft 68. Therefore, the rotating shaft 66 can be easily disassembled and assembled.

In addition, by connecting the inner shaft 68 and the outer shaft 70 in the manner described above, the inner shaft 68 and the outer shaft 70 can be rotated together in an integral manner. More specifically, relative idle rotation between the inner shaft 68 and the outer shaft 70 is avoided.

The locking sleeve 160 includes the tubular shaped main body portion 162 that covers one portion of the outer circumferential surface of the first hollow end part 72, and the outer circumferential surface of the nut member 130 from the exterior in the diametrical direction of the rotating shaft 66. The first engaging member 164 is provided at one end part in the axial direction of the tubular shaped main body portion 162. The second engaging member 166 is the diametrically directed projection 170 that projects out inwardly in the diametrical direction from the other end part in the axial direction of the tubular shaped main body portion 162. The diametrically directed projection 170 engages with the second locking member 136 provided on the nut member 130.

In accordance with such a configuration, it is possible to prevent relative idle rotation from occurring between the nut member 130 and the locking sleeve 160. Therefore, loosening of the nut member 130 is further prevented.

The diametrically directed projection 170 includes the plurality of tab-shaped portions 172. In addition, the second locking member 136 includes the plurality of projecting members 140 extending along the axial direction of the rotating shaft 66 from one end part of the nut member 130. One from among the plurality of tab-shaped portions 172 is inserted between two from among the plurality of projecting members 140 that are adjacent to each other in the direction of rotation of the rotating shaft 66.

In accordance with such a configuration, it becomes more difficult for the nut member 130 to undergo rotation. Therefore, loosening of the nut member 130 is further prevented.

Portions of the plurality of projecting members 140 project out from the tab-shaped portions 172 along the axial direction, and the inner circumferential surfaces of the projected portions come into contact with the outer circumferential surface of the locking ring 180.

Based on being placed in contact in this manner, the locking ring 180 is retained on the nut member 130 via the plurality of projecting members 140. By being retained in this manner, it becomes possible for the locking ring 180 to be easily positioned and fixed.

The positioning and fixing member 120 includes the retainer member 200 which is disposed at a position spaced apart from the diametrically directed projection 170 of the locking sleeve 160 in the axial direction. The retainer member 200 engages with an inner side of the plurality of projecting members 140. In the axial direction, the locking ring 180 is disposed between the retainer member 200 and the diametrically directed projection 170. The outer diameter of the locking ring 180 may be smaller than the inner diameter of the diametrically directed projection 170. In this case, the retainer member 200 prevents the locking ring 180 from separating away from the nut member 130.

In this manner, due to the retainer member 200, the locking ring 180, the locking sleeve 160, and the nut member 130 are prevented from coming off from the extending portion 90.

Each of the plurality of projecting members 140 includes the retaining portion 150 that prevents the retainer member 200 from coming off from the inner circumferential side of the plurality of projecting members 140.

Since the retainer member 200 is prevented from separating away from the inner circumferential side of the plurality of projecting members 140, the locking ring 180, the locking sleeve 160, and the nut member 130 are reliably prevented from coming off from the extending portion 90.

The retaining portion 150 includes, for example, the claw members 146 that are provided at the respective distal ends in the axial direction of the plurality of projecting members 140, and further, which project out toward the inner circumferential side of the plurality of projecting members 140. The diameter of the inscribed circle C1 formed by connecting the innermost circumferential portions of the claw members 146 is smaller than the outer diameter of the retainer member 200.

In accordance therewith, it is possible to reliably prevent the retainer member 200 from separating away from the inner circumferential side of the plurality of projecting members 140.

The retaining portion 150, for example, includes the insertion recesses 148 that are recessed outwardly in the diametrical direction from the respective inner circumferential surfaces of the plurality of projecting members 140. The outer circumferential edge part in the diametrical direction of the retainer member 200 is inserted into the insertion recesses 148.

In accordance with such a configuration as well, it is possible to reliably prevent the retainer member 200 from separating away from the inner circumferential side of the plurality of projecting members 140.

The retaining portion 150 may include the claw members 146 and the insertion recesses 148. In accordance with such a configuration as well, it is possible to reliably prevent the retainer member 200 from separating away from the inner circumferential side of the plurality of projecting members 140.

The third engaging member 184 engages between two from among the plurality of projecting members 140 that are adjacent in the direction of rotation.

In accordance with such a configuration, the nut member 130 is prevented from rotating with respect to the rotating shaft 66. Accordingly, loosening of the nut member 130 is further prevented.

The rotating shaft 66 constitutes the rotor 62 of the rotating electric machine 60.

As noted previously, since the rotating shaft 66 is easy to disassemble and assemble, it is easy to carry out maintenance with respect to the rotating electric machine 60. Further, since the nut member 130 is prevented from loosening at a time when the rotating electric machine 60 is operating, generation of vibrations in the rotating shaft 66 is suppressed.

In relation to the above-described disclosure, the following supplementary notes are further disclosed.
Supplementary Note 1

The rotating electric machine system (20) is equipped with the rotating electric machine (60) including the rotating shaft (66) and the permanent magnet (282), and the housing (22) in which the rotating electric machine is accommodated. The rotating electric machine system includes the bearing (400) interposed between the housing and the rotating shaft, and including the inner ring (402) and the outer ring (406), the bearing holder (420) provided in the housing and having a hollow tubular shape, the bearing holder being configured to retain the bearing, and the pressure applying member (441) provided between the bearing holder and the bearing, and configured to apply the pressure to the bearing holder along the axial direction of the rotating shaft.

The resultant force is formed by the diametrically directed input load that is input to the bearing from the rotating shaft, and the axially directed acting load that acts on the pressure applying member due to the input load. In the above-mentioned configuration, since the pressure applying member is accommodated inside the bearing holder, the acting load is considerably smaller than the input load. Accordingly, in the above-mentioned configuration, an intersection angle between the resultant force formed by the input load and the applied load, and the diametrical direction of the rotating shaft is considerably small.

Therefore, a rotational moment acting on the bearing due to the resultant force can be reduced. As a result, vibrations of the bearing are suppressed, and the load applied to the bearing is reduced. Consequently, the durability of the bearing and peripheral components of the bearing can be enhanced. The peripheral components are parts located near the bearing, and an example thereof is a bearing holder or the like.
Supplementary Note 2

In the rotating electric machine system according to Supplementary Note 1, the pressure applying member may apply the load to the side surface of the outer ring that faces toward the axial direction of the rotating shaft, along the axial direction of the rotating shaft.

In this case, the angle of intersection between the resultant force and the diametrical direction of the rotating shaft can be further reduced. Consequently, vibrations of the bearing are further suppressed, and the load applied to the bearing is further reduced. Accordingly, the durability of the bearing and peripheral components of the bearing can be further enhanced.
Supplementary Note 3

In the rotating electric machine system according to Supplementary Note 2, the outer diameter of the bearing and the outer diameter of the pressure applying member may be approximately equal.

Thus, it is possible to further reduce the angle of intersection between the resultant force and the diametrical direction of the rotating shaft. Consequently, vibrations of the bearing are further suppressed, and the load applied to the bearing is further reduced. Then, the durability of the bearing and peripheral components of the bearing can be enhanced further.
Supplementary Note 4

In the rotating electric machine system according to any one of Supplementary Notes 1 to 3, the pressure applying member may be the elastic body (442).

By having the pressure applying member be the elastic body, the pressure can be applied substantially uniformly over the entire circumference of the bearing.
Supplementary Note 5

In the rotating electric machine system according to Supplementary Note 4, the rotating electric machine system may further include the guide member (560) including the tubular shaped guide portion (562) disposed in the interior of the bearing holder, and the accommodating chamber (448) formed between the inner circumferential surface of the bearing holder and the outer circumferential surface of the tubular shaped guide portion, wherein the pressure applying member may be accommodated in the accommodating chamber.

In accordance with such a configuration, when the pressure applying member expands and contracts inside the accommodating chamber, the pressure applying member can be guided by the tubular shaped guide portion.
Supplementary Note 6

In the rotating electric machine system according to any one of Supplementary Notes 1 to 5, the rotating electric machine system may further include the oil supplying device (904) configured to supply the lubricating oil (LO) to the bearing, wherein the housing includes the oil supply passage (842) in order to supply the lubricating oil to the bearing, and the bearing holder may include the oil supply hole (436) at the position facing toward the outer circumferential surface of the bearing, and the oil supply hole places the inner circumferential surface and the outer circumferential surface of the bearing holder in communication with each other.

In accordance with such a configuration, the lubricating oil from the oil supplying device is capable of being supplied to the bearing, via the oil supply hole of the bearing holder.

In this manner, by the oil supply hole being formed in the bearing holder, the lubricating oil can easily be supplied to the bearing.

Supplementary Note 7

In the rotating electric machine system according to Supplementary Note 6, the rotating electric machine system may further include the intermediate member (440) accommodated in the interior of the bearing holder and interposed between the pressure applying member and the bearing in the axial direction, and the intermediate member may include the relay hole (446) through which the lubricating oil flows, and the pressure applying member may apply the pressure to the bearing via the intermediate member.

Even in the case that the rotating electric machine system is provided with the intermediate member, the lubricating oil that is supplied to the bearing can be discharged via the relay hole of the intermediate member, and the flow-through hole of the bearing holder. Alternatively, the lubricating oil that has flowed through the flow-through hole of the bearing holder, and thereafter, that has flowed through the relay hole of the intermediate member, can be supplied to the bearing. In this manner, by forming the relay hole in the intermediate member, and further, forming the flow-through hole in the bearing holder, the lubricating oil can be easily supplied to and discharged from the bearing.

In addition, since the intermediate member is interposed between the pressure applying member and the bearing, a situation can be avoided in which the pressure applying member directly contacts the bearing. Therefore, when the pressure applying member applies the pressure to the bearing, any concern that damage may be incurred by the bearing can be dispensed with.

Moreover, it should be noted that the present invention is not limited to the disclosure described above, but various configurations may be adopted therein without departing from the essence and gist of the present invention.

The invention claimed is:

1. A rotating electric machine system equipped with a rotating electric machine including a rotating shaft and a permanent magnet, and a housing in which the rotating electric machine is accommodated, the rotating electric machine system comprising:

a bearing interposed between the housing and the rotating shaft, and including an inner ring and an outer ring;

a bearing holder provided in the housing and having a hollow tubular shape, the bearing holder being configured to retain the bearing;

a pressure applying member configured to apply a pressure to the bearing holder along an axial direction of the rotating shaft;

an oil supplying device configured to supply a lubricating oil to the bearing; and an intermediate member accommodated in an interior of the bearing holder and interposed between the pressure applying member and the bearing in the axial direction; wherein the housing includes an oil supply passage in order to supply the lubricating oil to the bearing;

the intermediate member includes a relay hole through which the lubricating oil flows, the bearing holder includes an oil supply hole at a position facing toward an outer circumferential surface of the bearing, and the oil supply hole places an inner circumferential surface and an outer circumferential surface of the bearing holder in communication with each other; and the pressure applying member applies a pressure to the bearing via the intermediate member.

2. The rotating electric machine system according to claim 1, wherein the pressure applying member applies a load to a side surface of the outer ring that faces toward the axial direction of the rotating shaft, along the axial direction of the rotating shaft.

3. The rotating electric machine system according to claim 2, wherein an outer diameter of the bearing and an outer diameter of the pressure applying member are approximately equal.

4. The rotating electric machine system according to claim 1, wherein the pressure applying member is an elastic body.

5. The rotating electric machine system according to claim 4, further comprising a guide member including a tubular shaped guide portion disposed in an interior of the bearing holder, and an accommodating chamber formed between an inner circumferential surface of the bearing holder and an outer circumferential surface of the tubular shaped guide portion, wherein the pressure applying member is accommodated in the accommodating chamber.

\* \* \* \* \*